(12) United States Patent
Narasimha et al.

(10) Patent No.: US 11,974,345 B2
(45) Date of Patent: Apr. 30, 2024

(54) ROUTE ADAPTATION IN MULTI-HOP RELAY NETWORKS

(71) Applicant: APPLE INC., Cupertino, CA (US)

(72) Inventors: Murali Narasimha, Lake Oswego, OR (US); Qian Li, Beaverton, OR (US); Jaemin Han, Portland, OR (US); Alexander Sirotkin, Hod Hasharon (IL)

(73) Assignee: APPLE INC., Cupertino, CA (US)

( * ) Notice: Subject to any disclaimer, the term of this patent is extended or adjusted under 35 U.S.C. 154(b) by 337 days.

(21) Appl. No.: 17/277,116

(22) PCT Filed: Sep. 26, 2019

(86) PCT No.: PCT/US2019/053196
§ 371 (c)(1),
(2) Date: Mar. 17, 2021

(87) PCT Pub. No.: WO2020/069158
PCT Pub. Date: Apr. 2, 2020

(65) Prior Publication Data
US 2021/0378041 A1 Dec. 2, 2021

Related U.S. Application Data

(60) Provisional application No. 62/739,065, filed on Sep. 28, 2018.

(51) Int. Cl.
*H04W 24/00* (2009.01)
*H04W 24/04* (2009.01)
*H04W 40/02* (2009.01)
*H04W 76/19* (2018.01)

(52) U.S. Cl.
CPC .......... *H04W 76/19* (2018.02); *H04W 24/04* (2013.01); *H04W 40/02* (2013.01)

(58) Field of Classification Search
None
See application file for complete search history.

(56) References Cited

U.S. PATENT DOCUMENTS

| 2017/0171788 A1* | 6/2017 | Won ..................... H04W 36/08 |
| 2017/0223556 A1 | 8/2017 | Michael et al. |
| 2020/0092784 A1* | 3/2020 | Hampel ............. H04B 7/15528 |

FOREIGN PATENT DOCUMENTS

| KR | 1020180022699 A1 | 3/2018 |
| TW | 201025919 A | 7/2010 |
| WO | 2017139039 A1 | 8/2017 |

OTHER PUBLICATIONS

3GPP (3GPP TSG-RAN2 Meeting RAN2#103 R2-1812820, Jul. 2018).*
LG Electronics, "Discussions on node behavior for IAB link management, R1-1808515", 3GPP TSG RAN WG1 #94, Gothenburg, Sweden, Agenda Item 7.2.3.3, Aug. 20-24, 2018, 7 pages.
LG Electronics Inc., "Handling of the RLF on wireless backhaul link, R2-1812820", 3GPP TSG-RAN2 Meeting RAN2#103, Gothenburg, Sweden, Revised of R2-1810529, Aug. 20-24, 2018, 2 pages.

(Continued)

*Primary Examiner* — Abdelillah Elmejjarmi
(74) *Attorney, Agent, or Firm* — Dorsey & Whitney LLP

(57) ABSTRACT

Systems, method, and devices provide for recovery from backhaul failures for Integrated Access and Backhaul (IAB) communication systems with multi-hop routing.

20 Claims, 10 Drawing Sheets

(56) References Cited

OTHER PUBLICATIONS

PCT/US2019/053196, International Search Report and Written Opinion, dated Jan. 21, 2020, 12 pages.
Vivo, "Selection of Parent for IAB-Node, R2-18011779, 3GPP TSG-RAN WG2 Meeting #103", Gothenburg, Sweden, Agenda Item 11.1.3, Aug. 20-24, 2018, 3 pages.

* cited by examiner

ROUTE ADAPTATION IN MULTI-HOP RELAY NETWORKS

CROSS-REFERENCE TO RELATED APPLICATION(S)

This application is a national stage filing under 35 U.S.C. § 371 of International Patent Application No. PCT/US2019/053216, filed Sep. 26, 2019 which claims the benefit of U.S. Provisional Application No. 62/739,065, filed Sep. 28, 2018, each of which is hereby incorporated by reference herein in its entirety.

TECHNICAL FIELD

This application relates generally to wireless communication systems, and more specifically to Integrated Access and Backhaul (IAB).

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, new radio (NR) node or g Node B (gNB).

DETAILED DESCRIPTION

Integrated Access and Backhaul (IAB) is a feature being designed in 3GPP to enable multi-hop routing. IAB nodes serve as both access nodes to UEs and provide backhaul links to other IAB nodes. Embodiments herein enable systematic recovery from backhaul failures while providing a topologically efficient network with configured routes.

Example IAB Network Architecture

Figure 1:
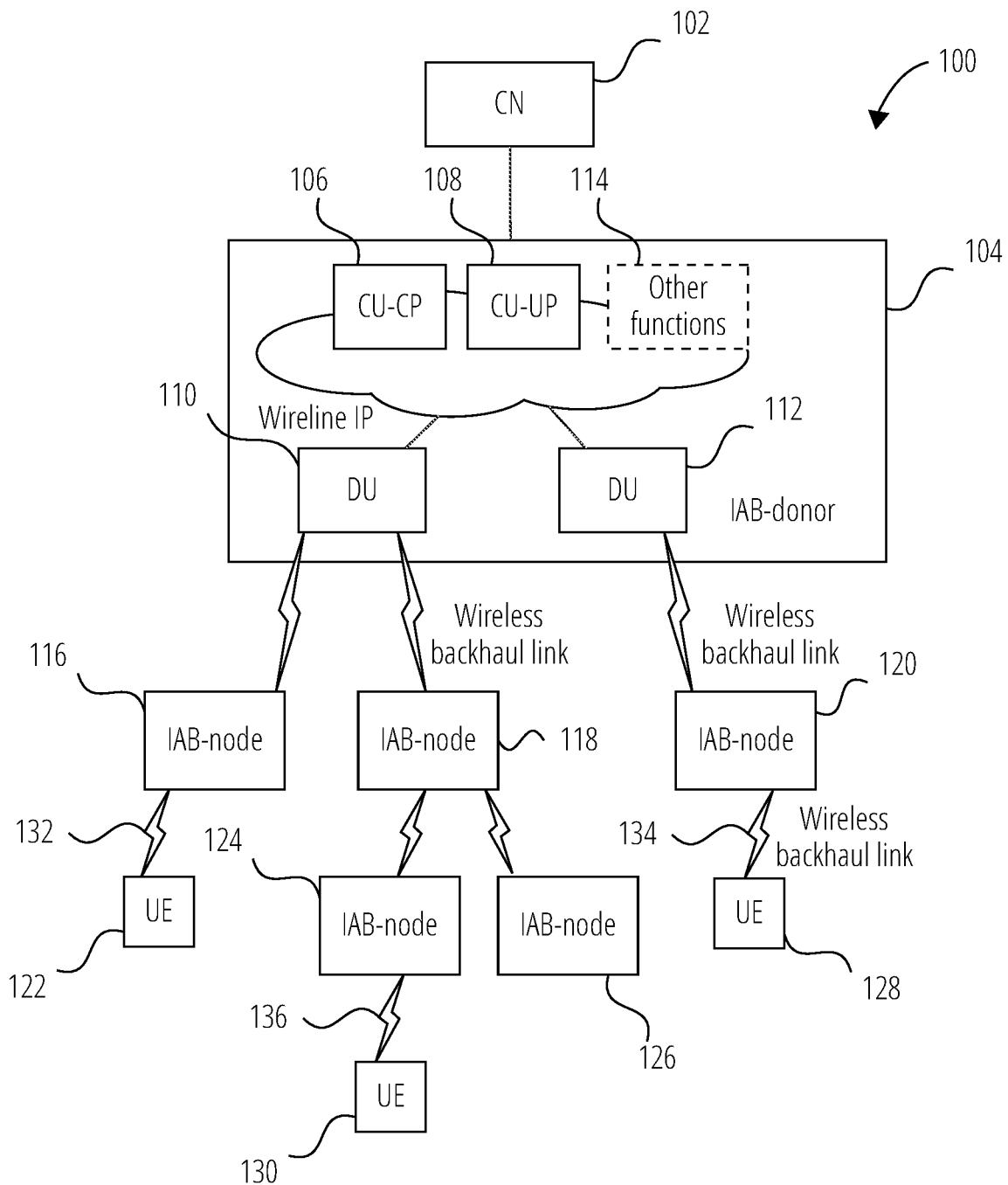
FIG. 1 illustrates an example IAB network.

By way of example, FIG. 1 illustrates an example IAB network 100 according to certain embodiments. The example IAB network 100 comprises a core network (shown as CN 102), an IAB donor node (shown as IAB-donor 104), a plurality of IAB nodes (five IAB nodes shown as IAB-node 116, IAB-node 118, IAB-node 120, IAB-node 124, and IAB-node 126), and a plurality of UEs (three UEs shown as UE 122, UE 128, and UE 130). The IAB-donor 104 may include a centralized unit-control plane (CU-CP, shown as CU-CP 106), a centralized-unit-user plane (CU-UP, shown as CU-UP 108), one or more distributed units (DU, two shown as DU 110 and DU 112), and other functions 114. The components within the IAB-donor 104 may be connected to one another and to the CN 102 with wireline IP links (wired links), whereas wireless backhaul links (e.g., wireless backhaul link 132, a wireless backhaul link 134, and a wireless backhaul link 136) are used for the IAB nodes to communicate with one another, the UEs and the IAB-donor 104.

Each IAB node is a network node in an IAB deployment having UE and (at least part of) gNB functions. As shown, some IAB nodes access other IAB nodes, and some IAB nodes access the IAB-donor 104. An IAB donor node (or IAB donor, also referred to as an "anchor node" or the like) is a network node in an IAB deployment that terminates NG interfaces via wired connection(s). The IAB donor may be a RAN node that provides a UE's interface to a core network (shown as 5GC 102) and wireless backhauling functionality to IAB nodes. An IAB node is a relay node and/or a RAN node that supports wireless access to UEs and wirelessly backhaul access traffic.

IAB nodes in an IAB network support attachment of UEs and other IAB nodes. However, IAB nodes do not have full-fledged base station (gNB) capabilities. An IAB network leverages the CU-DU split architecture. The radio resource control (RRC) functionality is placed in the CU (e.g., CU-CP 106 and/or CU-UP 108) of the IAB-donor 104. Each IAB node may functions as a DU. The IAB nodes are controlled by the IAB-donor 104 in a manner similar to the DU control by the CU. Specifically, the F1 control plane protocol between the CU and the DU is modified to support transmission over multiple hops; the modified F1 protocols enable the IAB-donor 104 to control the IAB nodes.

The backhaul links not only carry data for a UE attached to an IAB node and its descendant IAB nodes, but also support a control plane connection between an IAB node and the IAB-donor 104. Unlike traditional fixed backhaul links, the IAB backhaul links are subject to variety of impairments that can make the link unusable. For example, if millimeter-wave spectrum is used, the backhaul links can be blocked due to structures or mobile objects (such as vehicles). Even seasonal changes in foliage can cause blockages of the signals. Failure of a backhaul link can have much more significant impact to the IAB network than failure of a link between a base station and a UE. This is because not only do all the UEs connected to the IAB node which experiences the backhaul failure lose connectivity, but also all the descendant IAB nodes connected via the IAB node, and the UEs connected to the descendant IAB nodes lose connectivity. Thus, even in a well-designed network with rare occurrences of backhaul failures, when backhaul failures do occur, their impact can be severe. This loss of connectivity assumes that there is a single route from an IAB node to the IAB donor. It is possible, subject to appropriate standardization, to have configurations where an IAB node supports "multi-connectivity" and has routes to the IAB donor via more than one parent node. However, it may be extremely difficult to guarantee the presence of dual or multiple parents for every IAB node. Even for IAB nodes with dual or multi-connectivity, loss of one route can severely impact performance and establishing a substitute route may be very useful.

Observing that such backhaul failures can happen, embodiments herein define schemes to identify alternate routes. Certain embodiments provide fast and efficient recovery from backhaul failures, which provides useful functionality in IAB networks.

Example Control Plane Protocol Architecture for Multi-Hop IAB Network

Figure 2:
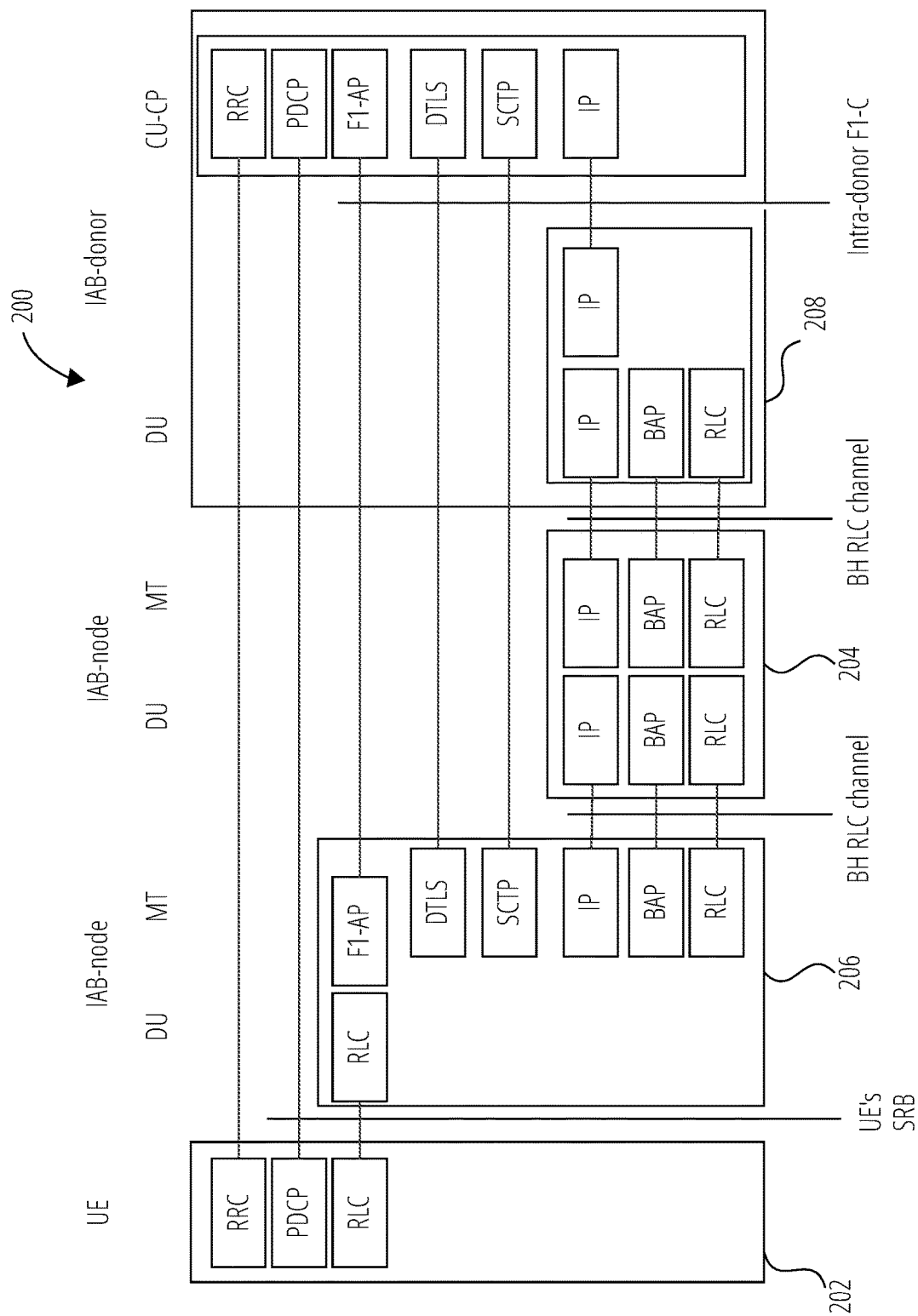
FIG. 2 illustrates an example protocol architecture for IAB.

FIG. 2 illustrates an example protocol architecture for IAB 200 according to one embodiment. In particular, FIG. 2 shows an example protocol architecture for RRC connectivity between a UE 202 and an IAB-donor 208. The example protocol architecture for IAB 200 shows various protocol layers for the UE 202, a first IAB-node 204 (IAB-node 1), a second IAB-node 206 (IAB-node 2), and the IAB-donor 208. The various layers may correspond to mobile terminated (MT), distributed unit (DU), or centralized unit (CU)-user plane (UP) entities. The DU and CU-CP of the IAB-donor 208 may communicate through an intra-donor F1-C interface. In this example, the UE 202 wirelessly communicates with the second IAB-node 206 through the UE's signaling radio bearer (SRB), and the second IAB-node 206 wirelessly relays the uplink traffic to the first IAB-node 204 through a backhaul (BH) radio link control (RLC) channel. The protocol layers include, for example, RLC, packet data convergence protocol (PDCP), RRC, stream control transmission protocol (SCTP), datagram transport layer security (DTLS), internet protocol (IP), and F1 application protocol (F1-AP).

The example protocol architecture for IAB 200 also includes a backhaul adaptation protocol (BAP) layer, which may also be referred to as an "Adapt" layer (short for Adaptation layer), that provides functionality for routing data for different UE bearers over different routes through the network. This may be done by having an adaptation layer header that includes some information to identify a bearer. The routing includes mapping incoming data to an outgoing link based on the bearer identifier.

Each IAB node operates as a combination of a DU (serving the next hop) and an MT (providing connectivity to the parent node). The mobile terminal (MT) of an IAB node embodies UE functionality to enable connectivity to the parent.

Figure 3:
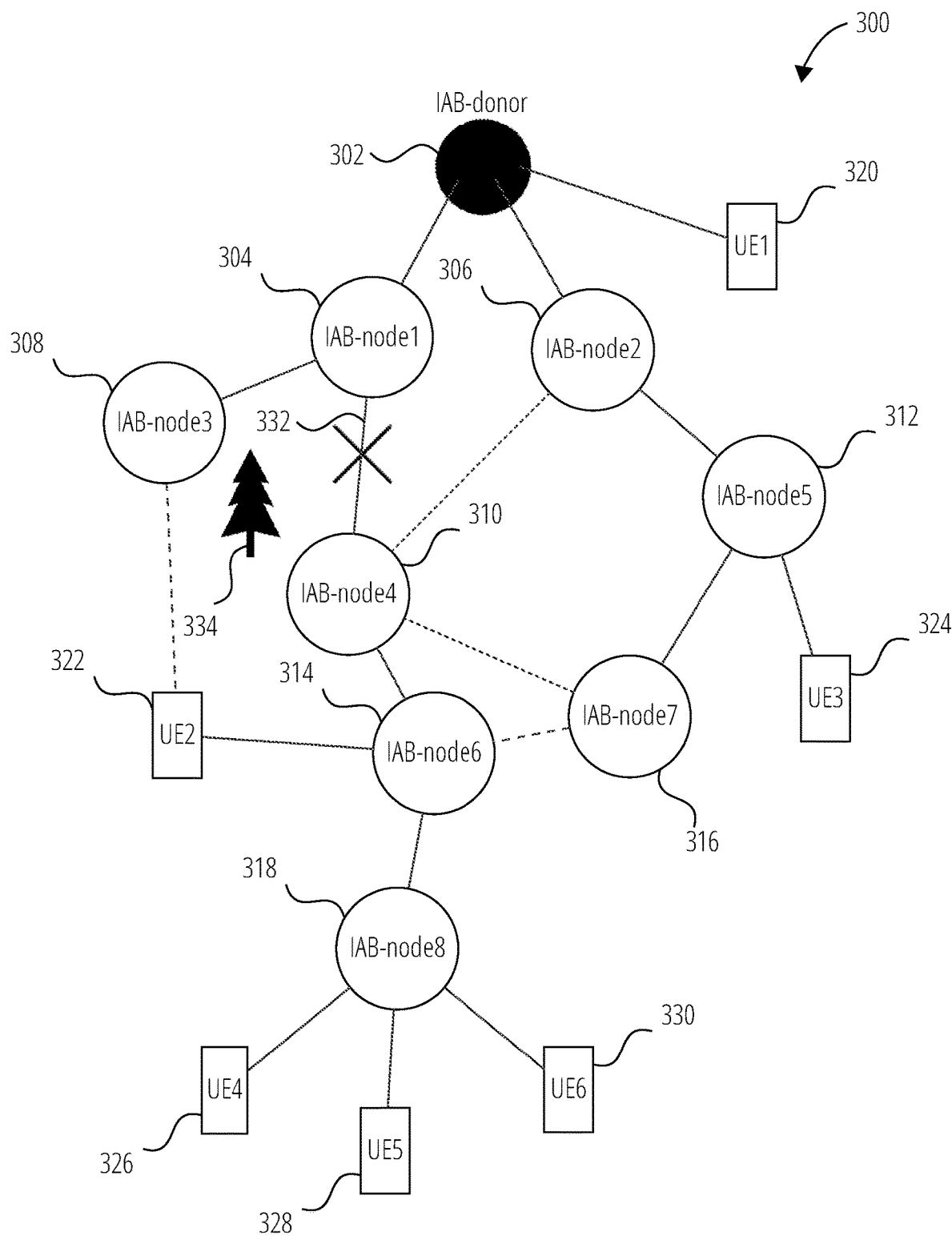
FIG. 3 schematically illustrates an example IAB network configured in accordance with one embodiment.

FIG. 3 schematically illustrates an example IAB network 300 configured according to certain embodiments. The IAB network 300 includes an IAB-donor 302, a first IAB-node 304 (IAB-node1), a second IAB-node 306 (IAB-node2), a third IAB-node 308 (IAB-node3), a fourth IAB-node 310 (IAB-node4), a fifth IAB-node 312 (IAB-node5), a sixth IAB-node 314 (IAB-node6), a seventh IAB-node 316 (IAB-node7), an eighth IAB-node 318 (IAB-node8). Each of the IAB nodes may include an MT and a DU (e.g., see FIG. 4).

An IAB node may receive uplink traffic from a descendant or child relay node (or from a UE) and provide the uplink traffic to a parent relay node. Uplink traffic from six UEs (a first UE 320 (UE1), a second UE 322 (UE2), a third UE 324 (UE3), a fourth UE 326 (UE4), a fifth UE 328 (UE5), and a sixth UE 330 (UE6)) are routed through the example IAB network 300. Both uplink and downlink traffic flow along the established links.

Different UEs are configured with different routes to the IAB-donor 302. For example, a route from the IAB-donor 302 to the first IAB-node 304 to the fourth IAB-node 310 to sixth IAB-node 314 to the eighth IAB-node 318 services the fourth UE 326, the fifth UE 328, and the sixth UE 330. As another example, a route from the IAB-donor 302 to the second IAB-node 306 to the fifth IAB-node 312 serves the third UE 324.

If the link between an IAB node and its parent node fails, the MT of the IAB node may follow the standard NR UE procedure when a radio link problem is detected. If the radio link problem is not resolved in a predefined time duration, the MT may declare a radio link failure (RLF). The MT then attempts to identify an alternate node to connect to, which may involve performing signal measurements of candidate nodes and identifying suitable candidates.

However, it is possible that the MT is not able to identify a suitable candidate node. In the example shown in FIG. 3, a link 332 between the first IAB-node 304 and the fourth IAB-node 310 fails. The fourth IAB-node 310 is unable to connect to third IAB-node 308 due to signal blockage 334, and the quality of signals from the second IAB-node 306 and the seventh IAB-node 316 is inadequate. Thus, the fourth IAB-node 310 is unable to find an alternate parent node and this makes the fourth IAB-node 310, sixth IAB-node 314, eighth IAB-node 318, second UE 322, fourth UE 326, fifth UE 328, and sixth UE 330 inaccessible.

In such a situation, the sixth IAB-node 314, the eighth IAB-node 318, the second UE 322, the fourth UE 326, the fifth UE 328, and the sixth UE 330 may independently attempt to identify their own alternate routes to the IAB-donor 302. It is useful to have well-defined procedures to do this. In particular, if all the nodes and UEs that are newly disconnected are informed of a backhaul failure along the route, they can individually attempt to simultaneously identify alternate connection points. This can result in a topologically inefficient or even useless arrangement.

For example, the second UE 322 may attempt to connect to the fourth IAB-node 310, which does not solve the problem. The eighth IAB-node 318 may connect to the seventh IAB-node 316, which would replace the seventh IAB-node 316 as the parent of the eighth IAB-node 318. Then if the sixth IAB-node 314 also connects to the seventh IAB-node 316, the eighth IAB-node 318 may be served better (better signal quality and throughput) if connected to the sixth IAB-node 314. Thus, in the interest of efficiency, the eighth IAB-node 318 may need to switch its backhaul link back to the sixth IAB-node 314. Further, the fourth UE 326, the fifth UE 328, and the sixth UE 330 may identify other parent nodes and switch their access links. Meanwhile, the sixth IAB-node 314 may be able to re-establish connectivity through the seventh IAB-node 316. Furthermore, identifying a parent IAB node does not guarantee that the IAB node is able to support the requisite traffic demands.

Accordingly, various embodiments are disclosed herein for fast and efficient recovery from backhaul failures.

Sequencing the RLF Recovery Process

In one embodiment, the following sequence provides a systematic and unambiguous recovery from backhaul failures. In particular, when the fourth IAB-node 310 experiences radio link problems and declares radio link failure (RLF), the fourth IAB-node 310 attempts to identify alternate parent nodes. Of the proximal nodes, the signal from the third IAB-node 308 is blocked and the signals from the second IAB-node 306 and the seventh IAB-node 316 are too weak. Thus, the fourth IAB-node 310 is unable to find an alternate parent node.

In response to being unable to find an alternate parent node, the fourth IAB-node 310 sends a "backhaul RLF" indication to all immediate descendant nodes (i.e., nodes attached to the DU of the fourth IAB-node 310) and all UEs attached to the fourth IAB-node 310, if any. The indication identifies the identity of the nodes that have not been able to identify alternate parent nodes (i.e., the fourth IAB-node 310. In this example, the sixth IAB-node 314 receives the backhaul RLF indication and in response attempts to identify alternate parent nodes. The sixth IAB-node 314 explicitly does not consider the fourth IAB-node 310 as a candidate for recovery.

If the sixth IAB-node 314 attaches to the seventh IAB-node 316 and recovers its connection, routes to the second UE 322, the fourth UE 326, the fifth UE 328, and the sixth UE 330 are re-established through the seventh IAB-node 316, the sixth IAB-node 314, and the eighth IAB-node 318.

If, however, the sixth IAB-node 314 is unable to identify an alternate parent node, the sixth IAB-node 314 sends a backhaul RLF indication to the eighth IAB-node 318 and the second UE 322. The indication identifies the fourth IAB-node 310 and the sixth IAB-node 314 as nodes that have not been able to identify alternate parent nodes. In response, the second UE 322 performs a search for an alternate access node and explicitly avoids considering the sixth IAB-node 314 and the fourth IAB-node 310 as candidates. In this example, the second UE 322 identifies third IAB-node 308 as a suitable candidate and attaches to the third IAB-node 308. The network then updates the route to the second UE 322 accordingly.

The eighth IAB-node 318 also attempts to perform a search for an alternate parent node and explicitly avoids considering the sixth IAB-node 314 and the fourth IAB-node 310 as candidates. The eighth IAB-node 318 identifies the seventh IAB-node 316 as a suitable candidate and attaches to the seventh IAB-node 316. The network then updates the routes to the fourth UE 326, the fifth UE 328, and the sixth UE 330 accordingly.

Similarly, if the eighth IAB-node 318 also fails to identify a suitable parent node, the eighth IAB-node 318 sends an RLF indication to the fourth UE 326, the fifth UE 328, and the sixth UE 330, which causes them to identify alternate access nodes (while explicitly avoiding the fourth IAB-node 310, the sixth IAB-node 314, and the eighth IAB-node 318).

Example Backhaul RLF Message

Figure 4:
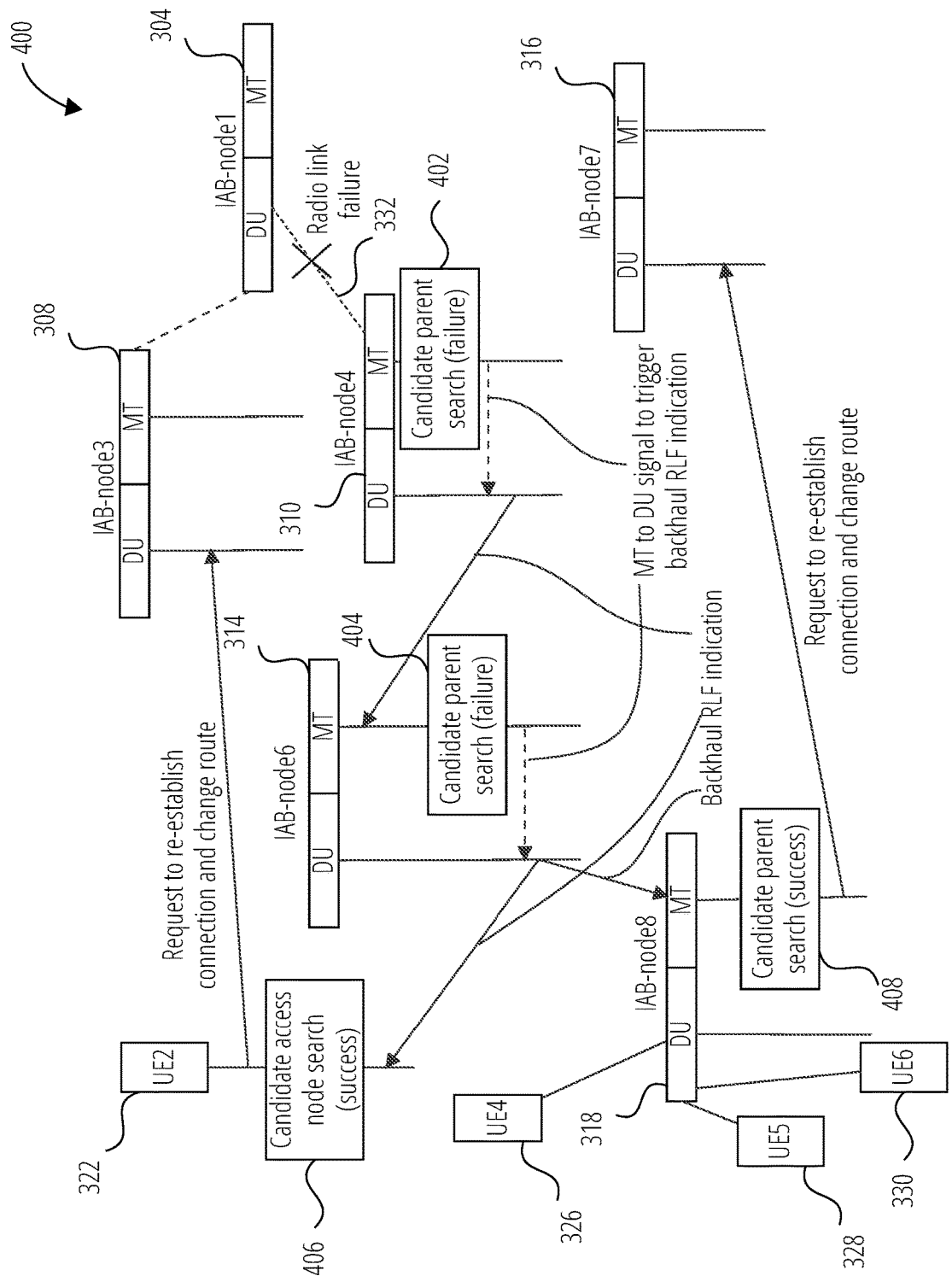
FIG. 4 illustrates additional details of a portion of the IAB network shown in FIG. 3 in accordance with one embodiment.

In one embodiment, the backhaul RLF indication is sent from an IAB node to its immediate descendant IAB nodes and to UEs attached to the IAB node. The backhaul RLF indication may be a broadcast downstream message, i.e., it is transmitted on all downstream outbound links from the node. For example, FIG. 4 illustrates additional details 400 of a portion of the IAB network 300 shown in FIG. 3 according to one embodiment. When the MT of an IAB node declares an RLF, the IAB node attempts to identify alternate parent nodes. If the search fails, the MT indicates to the DU of the IAB node that a backhaul RLF indication needs to be transmitted. The DU transmits a backhaul RLF indication to all nodes and UEs attached to the DU.

In response to receiving the backhaul RLF indication, the MT or UE performs a search for a suitable parent or access node, while excluding the nodes indicated in the backhaul RLF as unable to find alternate parent nodes. If successful, the MT or UE perform a switch of its backhaul or access link and transmits a request to the identified node requesting reestablishment of the connection and establishment of an alternate route.

For example, with reference to FIG. 3 and FIG. 4, when the fourth IAB-node 310 experiences radio link problems and declares radio link failure (RLF) on the link 332, the MT of the fourth IAB-node 310 performs candidate parent search 402 to identify alternate parent nodes. Of the proximal nodes, the signal from the third IAB-node 308 is blocked and the signals from the second IAB-node 306 and the seventh IAB-node 316 are too weak. Thus, the candidate parent search 402 results in failure and the fourth IAB-node 310 is unable to find an alternate parent node.

In response to being unable to find an alternate parent node, the MT of the fourth IAB-node 310 sends a signal to the DU of the fourth IAB-node 310 to trigger a backhaul RLF indication. The DU of the fourth IAB-node 310 sends the backhaul RLF indication to the MT of the sixth IAB-node 314. In response, the MT of the sixth IAB-node 314 performs a candidate parent search 404 in an attempt to identify alternate parent nodes. The candidate parent search 404 explicitly does not consider the fourth IAB-node 310 as a candidate for recovery.

In the example shown in FIG. 4, the candidate parent search 404 results in failure and the MT of the sixth IAB-node 314 is unable to identify an alternate parent node. Thus, the MT of the sixth IAB-node 314 sends a signal to the DU of the sixth IAB-node 314 to trigger a backhaul RLF indication. The DU of the sixth IAB-node 314 then sends the backhaul RLF indication to MT of the eighth IAB-node 318 and the second UE 322. The indication identifies the fourth IAB-node 310 and the sixth IAB-node 314 as nodes that have not been able to identify alternate parent nodes. In response, the second UE 322 performs a candidate access node search 406, which explicitly avoids considering the sixth IAB-node 314 and the fourth IAB-node 310 as candidates. In this example, the candidate access node search 406 is successful and the second UE 322 identifies third IAB-node 308 as a suitable candidate and sends a request to the DU of the third IAB-node 308 to re-establish connection and change the route of the second UE 322 to the IAB-donor 302. The network then updates the route to the second UE 322 accordingly.

Further, the MT of the eighth IAB-node 318 performs a candidate parent search 408 for an alternate parent node, which explicitly avoids considering the sixth IAB-node 314 and the fourth IAB-node 310 as candidates. In this example, the candidate parent search 408 is successful and MT of the eighth IAB-node 318 identifies the seventh IAB-node 316 as a suitable candidate. The MT of the eighth IAB-node 318 sends a request to the seventh IAB-node 316 to re-establish connection and change the route of the eighth IAB-node 318. The network then updates the route to the fourth UE 326, the fifth UE 328, and the sixth UE 330 accordingly.

In one embodiment, the request to establish an alternate route from an MT of an IAB node may include information about: UEs attached to the IAB node; descendant nodes that are connected to the IAB node directly or through other nodes; UEs attached to the descendant nodes; and/or a cause value for re-establishment (for which potentially the requested IAB node may be able to handle with high priority for the backhaul-link-lost downstream IAB nodes or UEs re-establishment request). Thus, the information in the request allows routes to be re-established for all of the impacted UEs and nodes.

The backhaul RLF indication can be a MAC message (such as a MAC control element) or an RLC message (i.e., an RLC control protocol data unit (PDU)). Given that the message is transmitted to all nodes and UEs attached to the DU of an IAB node, it may not need to be routed by the adaptation layer (i.e., no significant routing decisions are needed) and an adaptation layer header may not be needed. However, for convenience in protocol handling, the backhaul RLF indication could be defined as an RLC message.

Sequencing with Parallelization

In certain implementations of sequencing the RLF recovery process embodiments discussed above, the downstream nodes do not initiate their search for alternate parent nodes until the upstream nodes attempt to search for alternate parent nodes and fail. Given that this step scans for alternate nodes, the overall process may be very time consuming at each intermediate node and the interruption experienced by the UEs can be very significant. Thus, certain embodiments use sequencing with parallelization to mitigate the delays involved.

For example, when the fourth IAB-node 310 experiences radio link problems and declares radio link failure, the fourth IAB-node 310 may transmits a "preliminary backhaul RLF" indication to all immediate descendant nodes and all UEs attached to the fourth IAB-node 310. The preliminary backhaul RLF indication identifies the identity of the nodes that should not be considered as candidate alternate parent nodes (i.e., the fourth IAB-node 310).

The sixth IAB-node 314 receives the preliminary backhaul RLF indication and in response attempts to identify alternate parent nodes. The sixth IAB-node 314 explicitly does not consider the fourth IAB-node 310 as a candidate for recovery. In this example, the sixth IAB-node 314 is able to identify the seventh IAB-node 316 as a candidate alternate node for recovery. Meanwhile, the fourth IAB-node 310 attempts to identify alternate parent nodes. Of the proximal nodes, the signal from the third IAB-node 308 is blocked and the signals from the second IAB-node 306 and the seventh IAB-node 316 are too weak. Thus, the fourth IAB-node 310 is unable to find an alternate parent node. In response to being unable to find an alternate parent node, the fourth IAB-node 310 sends a "final backhaul RLF" indication to all immediate descendant nodes (i.e., nodes attached to the DU of the fourth IAB-node 310) and all UEs attached to the fourth IAB-node 310, if any. The sixth IAB-node 314 receives the final backhaul RLF indication and in response attaches to the seventh IAB-node 316 and recovers its connection. Routes to the second UE 322, the fourth UE 326, the fifth UE 328, and the sixth UE 330 are re-established through the seventh IAB-node 316, the sixth IAB-node 314, and the eighth IAB-node 318.

Both the preliminary backhaul RLF indication and the final backhaul RLF indication are transmitted downstream similar to the scheme for the backhaul RLF indication shown in FIG. 4. In response to the preliminary backhaul RLF indication, the MT or UE attempts to identify candidate nodes for recovery (while excluding nodes that are identified in the preliminary backhaul RLF indication as not to be considered for recovery). In response to the final backhaul RLF indication, the MT or UE attempts to perform connection recovery by attaching to a node which was identified as a candidate, if such a node was identified. If no node was identified as a candidate by an MT of an IAB node, the MT indicates to the DU of the IAB node that a final backhaul RLF indication needs to be transmitted.

Timer Based Sequencing

In one embodiment, instead of the two separate indications (i.e., both preliminary and final backhaul RLF indications), a timer based procedure may be defined. For example, after the fourth IAB-node 310 experiences radio link problems, declares radio link failure, and transmits a "backhaul RLF" indication to all immediate descendant nodes and all UEs attached to node 4, the sixth IAB-node 314 receives the backhaul RLF indication and starts a recovery timer in response. The sixth IAB-node 314 transmits a backhaul RLF indication to all immediate descendant nodes and UEs attached to it. The indication identifies the identity of the nodes which should not be considered as candidate alternate parent nodes (i.e., the fourth IAB-node 310 and the sixth IAB-node 314). Meanwhile, the fourth IAB-node 310 attempts to identify alternate parent nodes.

If the fourth IAB-node 310 is able to successfully identify a suitable alternate parent node, the fourth IAB-node 310 transmits a "backhaul recovery successful" indication. If a descendant node of the fourth IAB-node 310 or a UE attached to the fourth IAB-node 310 receives the "backhaul recovery successful" indication, descendant node cancels the recovery procedure and remains attached to the fourth IAB-node 310. A descendant node may also send a backhaul recovery successful indication downstream.

The sixth IAB-node 314 also attempts to identify alternate parent nodes. It explicitly does not consider the fourth IAB-node 310 as a candidate for recovery.

If the sixth IAB-node 314 receives a backhaul recovery successful indication from its parent node or if it is able to identify an alternate candidate parent node (e.g., the seventh IAB-node 316), the sixth IAB-node 314 transmits a backhaul recovery successful indication to its immediate descendant nodes and attached UE(s).

Assuming the fourth IAB-node 310 is unable to identify an alternate parent node (in which case the sixth IAB-node 314 does not receive a backhaul recovery successful indication), the recovery timer at the sixth IAB-node 314 expires. In response to the timer expiration, the sixth IAB-node 314 attaches to the seventh IAB-node 316 and recovers its connection. Routes to the second UE 322, the fourth UE 326, the fifth UE 328, and the sixth UE 330 are re-established through the seventh IAB-node 316, the sixth IAB-node 314, and the eighth IAB-node 318.

The backhaul RLF indication is used to trigger a candidate parent or candidate access node search at UEs and MTs of IAB nodes. An IAB node MT or a UE receiving the backhaul RLF indication also starts a recovery timer that controls whether the MT or the UE switches its parent node. The backhaul recovery successful indication is used to cancel a recovery procedure that has been initiated at an IAB node or a UE due to a prior backhaul RLF indication. If the recovery timer at an IAB node or a UE expires before it receives a backhaul recovery successful indication, the IAB node MT or UE attempts to perform a recovery by attaching to a candidate parent node.

In certain embodiments, the recovery timer duration can be different for different nodes and UEs. For example, the recovery timer duration at the sixth IAB-node 314 can be longer than that at the fourth IAB-node 310.

Figure 5:
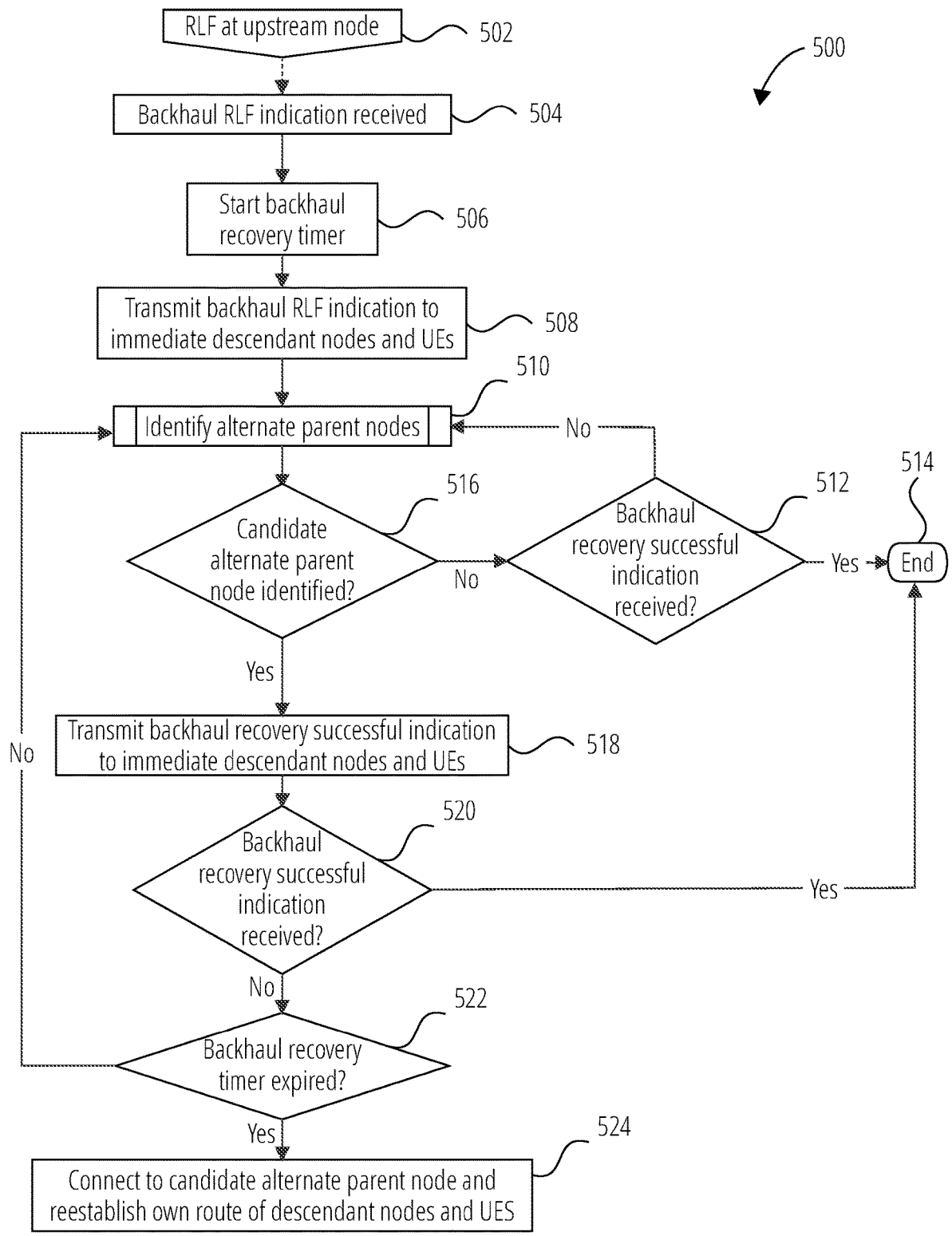
FIG. 5 is a flowchart of a method for timer based sequencing in accordance with one embodiment.

FIG. 5 is a flowchart of a method 500 for timer based sequencing according to one embodiment. The method 500 may be performed by an IAB node in an IAB network. The method 500 may begin at a block 502, when an upstream node experiences an RLF and the IAB node receives, at a block 504, a first backhaul RLF indication from the upstream node. The first backhaul RLF indication may identify nodes, including the parent node that experienced the RLF failure, that should not be considered as alternate parent nodes. In response to receiving the backhaul RLF indication, at a block 506, the IAB node starts a backhaul recovery timer. At a block 508, the IAB node transmits a second backhaul RLF indication to immediate descendant nodes and any UEs attached to the IAB node. The second backhaul RLF indication identifies nodes, including the IAB node and the parent node that experienced the RLF failure, that should not be considered as candidate alternate parent nodes.

At a block 510, the IAB node attempts to identify alternate parent nodes. Based on the first backhaul RLF indication, the IAB node does not consider the parent node as a candidate node for recovery. At a decision block 516, the IAB node determines whether a candidate alternate parent node is identified. If a candidate alternate parent node has not been identified, at a decision block 512, the IAB node determines whether a first backhaul recovery successful indication has been received from the parent node. If the first backhaul recovery successful indication has been received, then at a block 514, the method 500 ends. The IAB node may also send a second backhaul recovery successful indication to its immediate descendant nodes and any attached UEs before ending.

If, however, the first backhaul recovery successful indication has not been received, then the method 500 returns to the block 510 to continue attempting to identify alternate parent nodes. When the IAB node determines that a candidate alternate parent node has been identified, at a block 518, the IAB node transmits the second backhaul recovery successful indication to its immediate descendant nodes and any attached UEs.

At a decision block 520, the IAB node determines whether the first recovery backhaul recovery successful indication has been received from the parent node. If the first backhaul recovery successful indication has been received, then the method 500 ends at the 514. The IAB node may also send a second backhaul recovery successful indication to its immediate descendant nodes and any attached UEs before ending.

If the first backhaul recovery successful indication has not been received from the parent node, at a decision block 522, the IAB node determines whether the backhaul recovery timer has expired. If the backhaul recovery timer has not expired, the method 500 returns to the block 510. If, however, the backhaul recovery timer has expired, at a block 524, the IAB node connects to the identified candidate alternate parent node and reestablishes its own route and that of its descendant nodes and any attached UEs.

System Information Based Recovery

In one embodiment, system information broadcast by an IAB node can be used instead of the backhaul RLF message. For example, with reference to FIG. 3 and FIG. 4, when the fourth IAB-node 310 experiences radio link problems and declares radio link failure, the fourth IAB-node 310 attempts to identify alternate parent nodes. Of the proximal nodes, the signal from the third IAB-node 308 may be blocked and the signals from the second IAB-node 306 and the seventh IAB-node 316 may be too weak. Thus, the fourth IAB-node 310 may be unable to find an alternate parent node. In response to being unable to find an alternate parent node, the fourth IAB-node 310 updates its system information to signal that it is barred. The system information can additionally indicate which nodes should not be used as candidates for recovery (i.e., the fourth IAB-node 310). Specifically, the fourth IAB-node 310 can update information in its master information block (MIB) or first system information block (SIB1) to indicate the barring and the additional information.

In this example, the sixth IAB-node 314 may acquire the modified system information from the fourth IAB-node 310 and in response to the barring attempt to identify alternate parent nodes. The sixth IAB-node 314 explicitly does not consider the fourth IAB-node 310 as a candidate for recovery. The sixth IAB-node 314 attaches to the seventh IAB-node 316 and recovers its connection. Routes to the second UE 322, the fourth UE 326, the fifth UE 328, and the sixth UE 330 are re-established through the seventh IAB-node 316, the sixth IAB-node 314, and the eighth IAB-node 318.

If, however, the sixth IAB-node 314 is also unable to identify an alternate parent node, the sixth IAB-node 314 updates its system information to signal that it is barred. The system information can additionally indicate which nodes should not be used as candidates for recovery (i.e., the fourth IAB-node 310 and the sixth IAB-node 314). The second UE 322 may perform a search for an alternate access node and may explicitly avoid considering the sixth IAB-node 314 and the fourth IAB-node 310 as candidates. The second UE 322 may identify the third IAB-node 308 as a suitable candidate and attaches to the third IAB-node 308. The network then updates the route to the second UE 322 accordingly.

The eighth IAB-node 318 may also attempt to perform a search for an alternate parent node and may explicitly avoid considering the sixth IAB-node 314 and the fourth IAB-node 310 as candidates. The eighth IAB-node 318 may identify the seventh IAB-node 316 as a suitable candidate and may attach to the seventh IAB-node 316. The network then updates the routes to the fourth UE 326, the fifth UE 328, and the sixth UE 330 accordingly.

Example Alternates for Delivering Backhaul RLF Indication

In one embodiment, the backhaul RLF indication can also be conveyed via a physical layer message. For example, a backhaul RLF physical downlink control channel (PDCCH) can be designed such that when an IAB node MT experiences a backhaul failure, it transmits the backhaul RLF PDCCH on the downlink from its DU.

In another embodiment, a group common PDCCH (GC-PDCCH) can be used, enabling the transmission of a broadcast physical layer control message that can be received by all immediate descendant IAB nodes and UEs.

Example Systems and Devices

Figure 6:
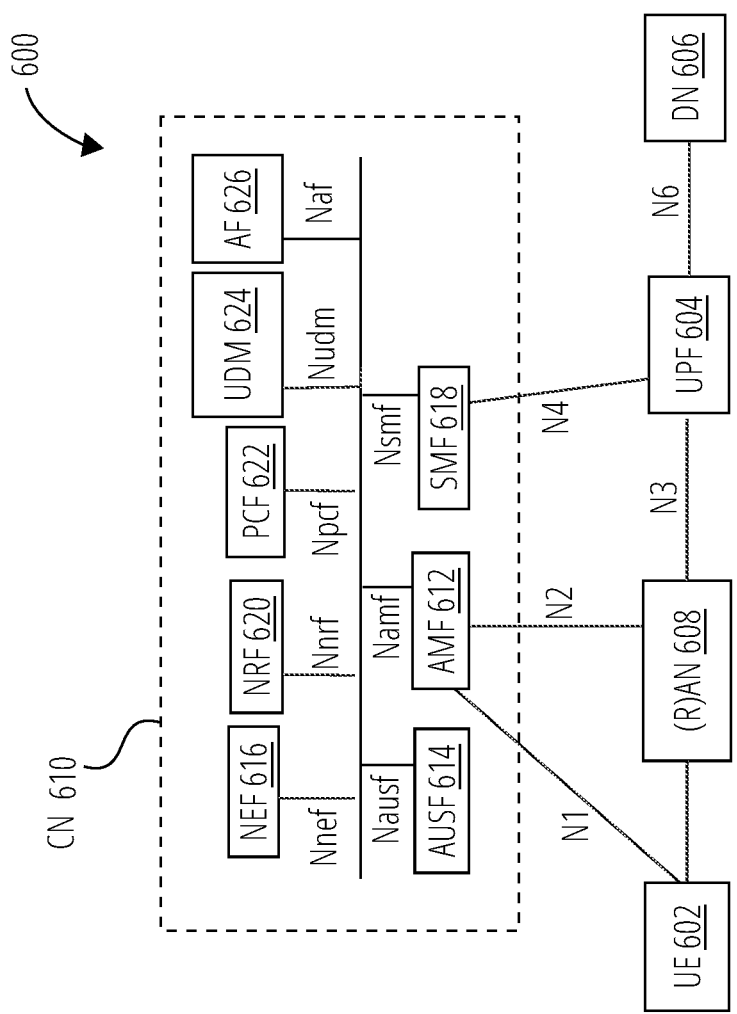
FIG. 6 illustrates a system in accordance with one embodiment.

FIG. 6 illustrates an architecture of a system 600 of a network in accordance with some embodiments. The system 600 is shown to include a UE 602; a 5G access node or RAN node (shown as (R)AN node 608); a User Plane Function (shown as UPF 604); a Data Network (DN 606), which may be, for example, operator services, Internet access or 3rd party services; and a 5G Core Network (5GC) (shown as CN 610).

The CN 610 may include an Authentication Server Function (AUSF 614); a Core Access and Mobility Management Function (AMF 612); a Session Management Function (SMF 618); a Network Exposure Function (NEF 616); a Policy Control Function (PCF 622); a Network Function (NF) Repository Function (NRF 620); a Unified Data Management (UDM 624); and an Application Function (AF 626). The CN 610 may also include other elements that are not shown, such as a Structured Data Storage network function (SDSF), an Unstructured Data Storage network function (UDSF), and the like.

The UPF 604 may act as an anchor point for intra-RAT and inter-RAT mobility, an external PDU session point of interconnect to DN 606, and a branching point to support multi-homed PDU session. The UPF 604 may also perform packet routing and forwarding, packet inspection, enforce user plane part of policy rules, lawfully intercept packets (UP collection); traffic usage reporting, perform QoS handling for user plane (e.g. packet filtering, gating, UL/DL rate enforcement), perform Uplink Traffic verification (e.g., SDF to QoS flow mapping), transport level packet marking in the uplink and downlink, and downlink packet buffering and downlink data notification triggering. UPF 604 may include an uplink classifier to support routing traffic flows to a data network. The DN 606 may represent various network operator services, Internet access, or third party services.

The AUSF 614 may store data for authentication of UE 602 and handle authentication related functionality. The AUSF 614 may facilitate a common authentication framework for various access types.

The AMF 612 may be responsible for registration management (e.g., for registering UE 602, etc.), connection management, reachability management, mobility management, and lawful interception of AMF-related events, and access authentication and authorization. AMF 612 may provide transport for SM messages for the SMF 618, and act as a transparent proxy for routing SM messages. AMF 612 may also provide transport for short message service (SMS) messages between UE 602 and an SMS function (SMSF) (not shown by FIG. 6). AMF 612 may act as Security Anchor Function (SEA), which may include interaction with the AUSF 614 and the UE 602, receipt of an intermediate key that was established as a result of the UE 602 authentication process. Where USIM based authentication is used, the AMF 612 may retrieve the security material from the AUSF 614. AMF 612 may also include a Security Context Management (SCM) function, which receives a key from the SEA that it uses to derive access-network specific keys. Furthermore, AMF 612 may be a termination point of RAN CP interface (N2 reference point), a termination point of NAS (NI) signaling, and perform NAS ciphering and integrity protection.

AMF 612 may also support NAS signaling with a UE 602 over an N3 interworking-function (IWF) interface. The N3IWF may be used to provide access to untrusted entities. N3IWF may be a termination point for the N2 and N3 interfaces for control plane and user plane, respectively, and as such, may handle N2 signaling from SMF and AMF for PDU sessions and QoS, encapsulate/de-encapsulate packets for IPSec and N3 tunneling, mark N3 user-plane packets in the uplink, and enforce QoS corresponding to N3 packet marking taking into account QoS requirements associated to such marking received over N2. N3IWF may also relay uplink and downlink control-plane NAS (NI) signaling between the UE 602 and AMF 612, and relay uplink and downlink user-plane packets between the UE 602 and UPF 604. The N3IWF also provides mechanisms for IPsec tunnel establishment with the UE 602.

The SMF 618 may be responsible for session management (e.g., session establishment, modify and release, including tunnel maintain between UPF and AN node); UE IP address allocation & management (including optional Authorization); Selection and control of UP function; Configures traffic steering at UPF to route traffic to proper destination; termination of interfaces towards Policy control functions; control part of policy enforcement and QoS; lawful intercept (for SM events and interface to LI System); termination of SM parts of NAS messages; downlink Data Notification; initiator of AN specific SM information, sent via AMF over N2 to AN; determine SSC mode of a session. The SMF 618 may include the following roaming functionality: handle local enforcement to apply QoS SLAB (VPLMN); charging data collection and charging interface (VPLMN); lawful intercept (in VPLMN for SM events and interface to LI System); support for interaction with external DN for transport of signaling for PDU session authorization/authentication by external DN.

The NEF 616 may provide means for securely exposing the services and capabilities provided by 3GPP network functions for third party, internal exposure/re-exposure, Application Functions (e.g., AF 626), edge computing or fog computing systems, etc. In such embodiments, the NEF 616 may authenticate, authorize, and/or throttle the AFs. NEF 616 may also translate information exchanged with the AF 626 and information exchanged with internal network functions. For example, the NEF 616 may translate between an AF-Service-Identifier and an internal 5GC information. NEF 616 may also receive information from other network functions (NFs) based on exposed capabilities of other network functions. This information may be stored at the NEF 616 as structured data, or at a data storage NF using a standardized interfaces. The stored information can then be re-exposed by the NEF 616 to other NFs and AFs, and/or used for other purposes such as analytics.

The NRF 620 may support service discovery functions, receive NF Discovery Requests from NF instances, and provide the information of the discovered NF instances to the NF instances. NRF 620 also maintains information of available NF instances and their supported services.

The PCF 622 may provide policy rules to control plane function(s) to enforce them, and may also support unified policy framework to govern network behavior. The PCF 622 may also implement a front end (FE) to access subscription information relevant for policy decisions in a UDR of UDM 624.

The UDM 624 may handle subscription-related information to support the network entities' handling of communication sessions, and may store subscription data of UE 602. The UDM 624 may include two parts, an application FE and a User Data Repository (UDR). The UDM may include a UDM FE, which is in charge of processing of credentials, location management, subscription management and so on. Several different front ends may serve the same user in different transactions. The UDM-FE accesses subscription information stored in the UDR and performs authentication credential processing; user identification handling; access authorization; registration/mobility management; and subscription management. The UDR may interact with PCF 622. UDM 624 may also support SMS management, wherein an SMS-FE implements the similar application logic as discussed previously.

The AF 626 may provide application influence on traffic routing, access to the Network Capability Exposure (NCE), and interact with the policy framework for policy control. The NCE may be a mechanism that allows the 5GC and AF 626 to provide information to each other via NEF 616, which may be used for edge computing implementations. In such implementations, the network operator and third party services may be hosted close to the UE 602 access point of attachment to achieve an efficient service delivery through the reduced end-to-end latency and load on the transport network. For edge computing implementations, the 5GC may select a UPF 604 close to the UE 602 and execute traffic steering from the UPF 604 to DN 606 via the N6 interface. This may be based on the UE subscription data, UE location, and information provided by the AF 626. In this way, the AF 626 may influence UPF (re)selection and traffic routing. Based on operator deployment, when AF 626 is considered to be a trusted entity, the network operator may permit AF 626 to interact directly with relevant NFs.

As discussed previously, the CN 610 may include an SMSF, which may be responsible for SMS subscription checking and verification, and relaying SM messages to/from the UE 602 to/from other entities, such as an SMS-GMSC/IWMSC/SMS-router. The SMS may also interact with AMF 612 and UDM 624 for notification procedure that the UE 602 is available for SMS transfer (e.g., set a UE not reachable flag, and notifying UDM 624 when UE 602 is available for SMS).

The system 600 may include the following service-based interfaces: Namf: Service-based interface exhibited by AMF; Nsmf: Service-based interface exhibited by SMF; Nnef: Service-based interface exhibited by NEF; Npcf: Service-based interface exhibited by PCF; Nudm: Service-based interface exhibited by UDM; Naf: Service-based interface exhibited by AF; Nnrf: Service-based interface exhibited by NRF; and Nausf: Service-based interface exhibited by AUSF.

The system 600 may include the following reference points: N1: Reference point between the UE and the AMF; N2: Reference point between the (R)AN and the AMF; N3: Reference point between the (R)AN and the UPF; N4: Reference point between the SMF and the UPF; and N6: Reference point between the UPF and a Data Network. There may be many more reference points and/or service-based interfaces between the NF services in the NFs, however, these interfaces and reference points have been omitted for clarity. For example, an NS reference point may be between the PCF and the AF; an N7 reference point may be between the PCF and the SMF; an N11 reference point between the AMF and SMF; etc. In some embodiments, the CN 610 may include an Nx interface, which is an inter-CN interface between the MME and the AMF 612 in order to enable interworking between CN 610 and an LTE core network.

Although not shown by FIG. 6, the system 600 may include multiple RAN nodes (such as (R)AN node 608) wherein an Xn interface is defined between two or more (R)AN node 608 (e.g., gNBs and the like) that connecting to 5GC 410, between a (R)AN node 608 (e.g., gNB) connecting to CN 610 and an eNB, and/or between two eNBs connecting to CN 610.

In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 602 in a connected mode (e.g., CM-CONNECTED) including functionality to manage the UE mobility for connected mode between one or more (R)AN node 608. The mobility support may include context transfer from an old (source) serving (R)AN node 608 to new (target) serving (R)AN node 608; and control of user plane tunnels between old (source) serving (R)AN node 608 to new (target) serving (R)AN node 608.

A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on an SCTP layer. The SCTP layer may be on top of an IP layer. The SCTP layer provides the guaranteed delivery of application layer messages. In the transport IP layer point-to-point transmission is used to deliver the signaling PDUs. In other implementations, the Xn-U protocol stack and/or the Xn-C protocol stack may be same or similar to the user plane and/or control plane protocol stack(s) shown and described herein.

Figure 7:
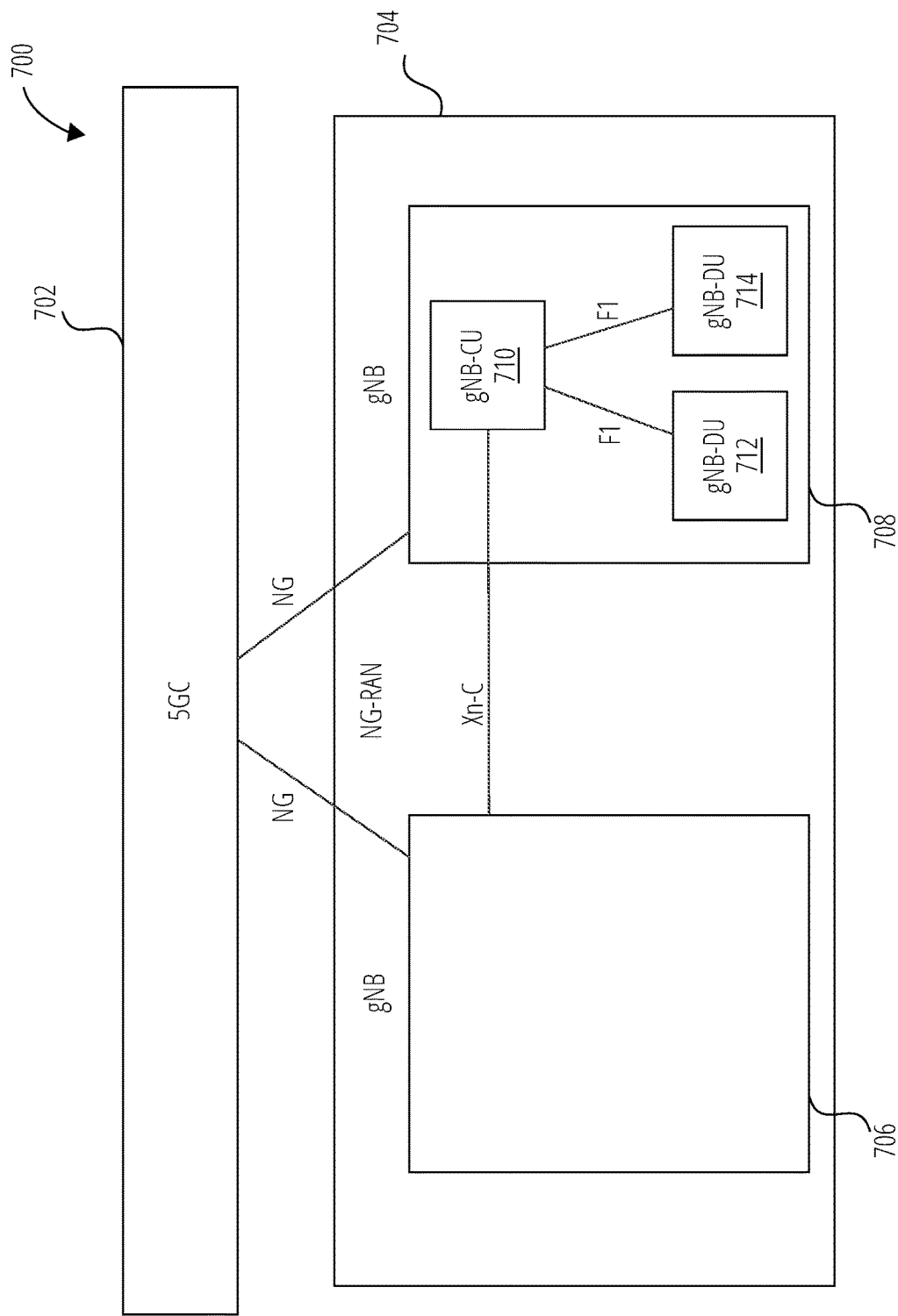
FIG. 7 illustrates an NG-RAN architecture in accordance with one embodiment.

FIG. 7 illustrates an NG-RAN architecture 700, according to one embodiment, comprising a 5GC 702 and an NG-RAN 704. The NG-RAN 704 includes a plurality of gNB (two gNB shown as gNB 706 and gNB 708) connected to the 5GC 702 through the NG interface. The gNB 706 and gNB 708 can support FDD mode, TDD mode, or dual mode operation, and are connected to one another through the Xn-C interface. As shown, the gNB 708 includes a gNB-CU 710 connected to a gNB-DU 712 and a gNB-DU 714 through the F1 interface. The gNB 708 may include only a single gNB-DU or more than the two gNB-DUs shown. The NG interface, Xn-C interface, and F1 interface are logical interfaces.

Figure 8:
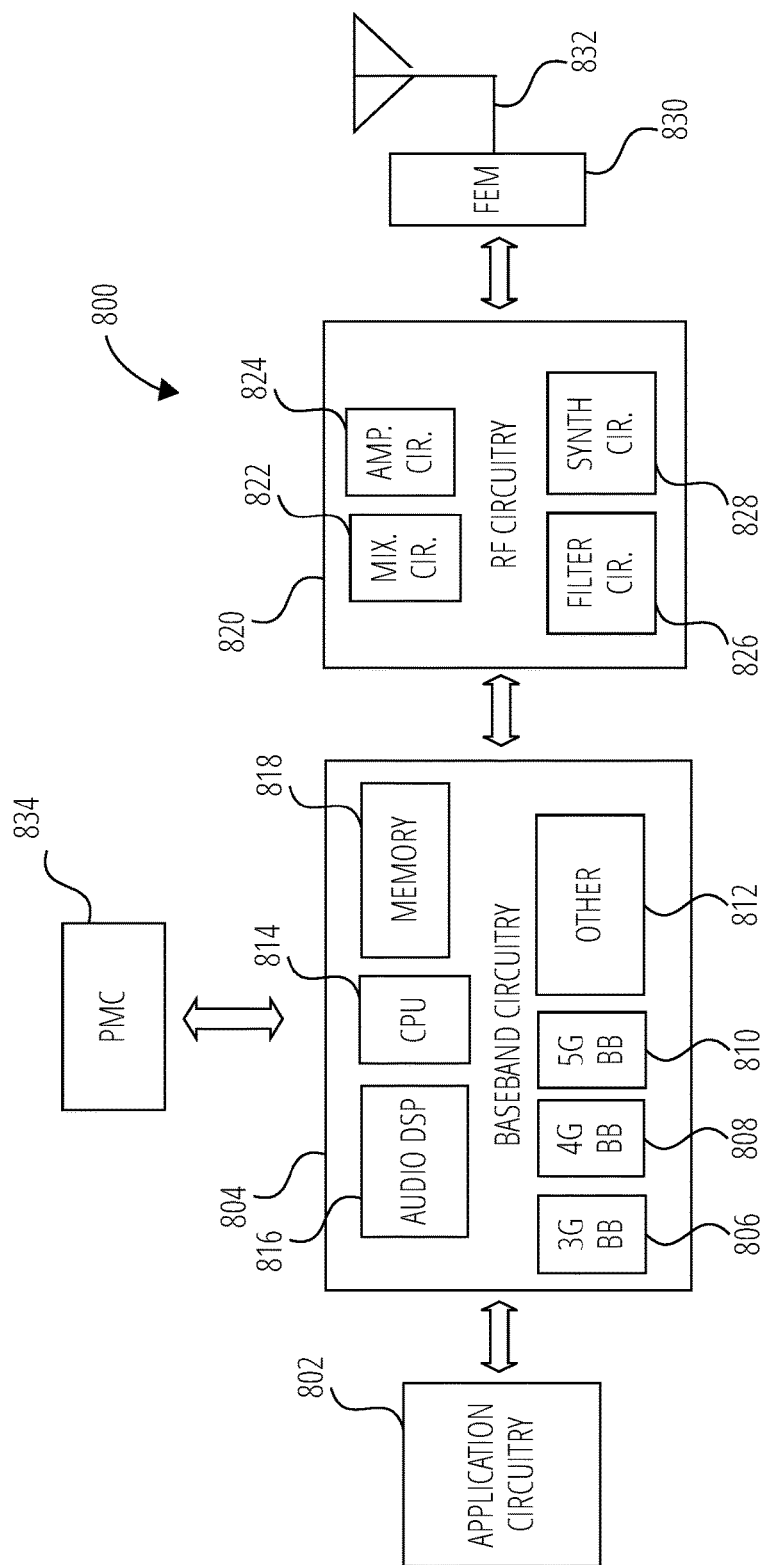
FIG. 8 illustrates a device in accordance with one embodiment.

FIG. 8 illustrates example components of a device 800 in accordance with some embodiments. In some embodiments, the device 800 may include application circuitry 802, baseband circuitry 804, Radio Frequency (RF) circuitry (shown as RF circuitry 820), front-end module (FEM) circuitry (shown as FEM circuitry 830), one or more antennas 832, and power management circuitry (PMC) (shown as PMC 834) coupled together at least as shown. The components of the illustrated device 800 may be included in a UE or a RAN node. In some embodiments, the device 800 may include fewer elements (e.g., a RAN node may not utilize application circuitry 802, and instead include a processor/controller to process IP data received from an EPC). In some embodiments, the device 800 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 802 may include one or more application processors. For example, the application circuitry 802 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 800. In some embodiments, processors of application circuitry 802 may process IP data packets received from an EPC.

The baseband circuitry 804 may include circuitry such as, but not limited to, one or more single-core or multi-core processors. The baseband circuitry 804 may include one or more baseband processors or control logic to process baseband signals received from a receive signal path of the RF circuitry 820 and to generate baseband signals for a transmit signal path of the RF circuitry 820. The baseband circuitry 804 may interface with the application circuitry 802 for generation and processing of the baseband signals and for controlling operations of the RF circuitry 820. For example, in some embodiments, the baseband circuitry 804 may include a third generation (3G) baseband processor (3G baseband processor 806), a fourth generation (4G) baseband processor (4G baseband processor 808), a fifth generation (5G) baseband processor (5G baseband processor 810), or other baseband processor(s) 812 for other existing generations, generations in development or to be developed in the future (e.g., second generation (2G), sixth generation (6G), etc.). The baseband circuitry 804 (e.g., one or more of baseband processors) may handle various radio control functions that enable communication with one or more radio networks via the RF circuitry 820. In other embodiments, some or all of the functionality of the illustrated baseband processors may be included in modules stored in the memory 818 and executed via a Central Processing Unit (CPU 814). The radio control functions may include, but are not limited to, signal modulation/demodulation, encoding/decoding, radio frequency shifting, etc. In some embodiments, modulation/demodulation circuitry of the baseband circuitry 804 may include Fast-Fourier Transform (FFT), precoding, or constellation mapping/demapping functionality. In some embodiments, encoding/decoding circuitry of the baseband circuitry 804 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 804 may include a digital signal processor (DSP), such as one or more audio DSP(s) 816. The one or more audio DSP(s) 816 may include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 804 and the application circuitry 802 may be implemented together such as, for example, on a system on a chip (SOC).

In some embodiments, the baseband circuitry 804 may provide for communication compatible with one or more radio technologies. For example, in some embodiments, the baseband circuitry 804 may support communication with an evolved universal terrestrial radio access network (EUTRAN) or other wireless metropolitan area networks (WMAN), a wireless local area network (WLAN), or a wireless personal area network (WPAN). Embodiments in which the baseband circuitry 804 is configured to support radio communications of more than one wireless protocol may be referred to as multi-mode baseband circuitry.

The RF circuitry 820 may enable communication with wireless networks using modulated electromagnetic radiation through a non-solid medium. In various embodiments, the RF circuitry 820 may include switches, filters, amplifiers, etc. to facilitate the communication with the wireless network. The RF circuitry 820 may include a receive signal path which may include circuitry to down-convert RF signals received from the FEM circuitry 830 and provide baseband signals to the baseband circuitry 804. The RF circuitry 820 may also include a transmit signal path which may include circuitry to up-convert baseband signals provided by the baseband circuitry 804 and provide RF output signals to the FEM circuitry 830 for transmission.

In some embodiments, the receive signal path of the RF circuitry 820 may include mixer circuitry 822, amplifier circuitry 824 and filter circuitry 826. In some embodiments, the transmit signal path of the RF circuitry 820 may include filter circuitry 826 and mixer circuitry 822. The RF circuitry 820 may also include synthesizer circuitry 828 for synthesizing a frequency for use by the mixer circuitry 822 of the receive signal path and the transmit signal path. In some embodiments, the mixer circuitry 822 of the receive signal path may be configured to down-convert RF signals received from the FEM circuitry 830 based on the synthesized frequency provided by synthesizer circuitry 828. The amplifier circuitry 824 may be configured to amplify the down-converted signals and the filter circuitry 826 may be a low-pass filter (LPF) or band-pass filter (BPF) configured to remove unwanted signals from the down-converted signals to generate output baseband signals. Output baseband signals may be provided to the baseband circuitry 804 for further processing. In some embodiments, the output baseband signals may be zero-frequency baseband signals, although this is not a requirement. In some embodiments, the mixer circuitry 822 of the receive signal path may comprise passive mixers, although the scope of the embodiments is not limited in this respect.

In some embodiments, the mixer circuitry 822 of the transmit signal path may be configured to up-convert input baseband signals based on the synthesized frequency provided by the synthesizer circuitry 828 to generate RF output signals for the FEM circuitry 830. The baseband signals may be provided by the baseband circuitry 804 and may be filtered by the filter circuitry 826.

In some embodiments, the mixer circuitry 822 of the receive signal path and the mixer circuitry 822 of the transmit signal path may include two or more mixers and may be arranged for quadrature downconversion and upconversion, respectively. In some embodiments, the mixer circuitry 822 of the receive signal path and the mixer circuitry 822 of the transmit signal path may include two or more mixers and may be arranged for image rejection (e.g., Hartley image rejection). In some embodiments, the mixer circuitry 822 of the receive signal path and the mixer circuitry 822 may be arranged for direct downconversion and direct upconversion, respectively. In some embodiments, the mixer circuitry 822 of the receive signal path and the mixer circuitry 822 of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 820 may include analog-to-digital converter (ADC) and digital-to-analog converter (DAC) circuitry and the baseband circuitry 804 may include a digital baseband interface to communicate with the RF circuitry 820.

In some dual-mode embodiments, a separate radio IC circuitry may be provided for processing signals for each spectrum, although the scope of the embodiments is not limited in this respect.

In some embodiments, the synthesizer circuitry 828 may be a fractional-N synthesizer or a fractional N/N+1 synthesizer, although the scope of the embodiments is not limited in this respect as other types of frequency synthesizers may be suitable. For example, synthesizer circuitry 828 may be a delta-sigma synthesizer, a frequency multiplier, or a synthesizer comprising a phase-locked loop with a frequency divider.

The synthesizer circuitry 828 may be configured to synthesize an output frequency for use by the mixer circuitry 822 of the RF circuitry 820 based on a frequency input and a divider control input. In some embodiments, the synthesizer circuitry 828 may be a fractional N/N+1 synthesizer.

In some embodiments, frequency input may be provided by a voltage controlled oscillator (VCO), although that is not a requirement. Divider control input may be provided by either the baseband circuitry 804 or the application circuitry 802 (such as an applications processor) depending on the desired output frequency. In some embodiments, a divider control input (e.g., N) may be determined from a look-up table based on a channel indicated by the application circuitry 802.

Synthesizer circuitry 828 of the RF circuitry 820 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 828 may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 820 may include an IQ/polar converter.

The FEM circuitry 830 may include a receive signal path which may include circuitry configured to operate on RF signals received from one or more antennas 832, amplify the received signals and provide the amplified versions of the received signals to the RF circuitry 820 for further processing. The FEM circuitry 830 may also include a transmit signal path which may include circuitry configured to amplify signals for transmission provided by the RF circuitry 820 for transmission by one or more of the one or more antennas 832. In various embodiments, the amplification through the transmit or receive signal paths may be done solely in the RF circuitry 820, solely in the FEM circuitry 830, or in both the RF circuitry 820 and the FEM circuitry 830.

In some embodiments, the FEM circuitry 830 may include a TX/RX switch to switch between transmit mode and receive mode operation. The FEM circuitry 830 may include a receive signal path and a transmit signal path. The receive signal path of the FEM circuitry 830 may include an LNA to amplify received RF signals and provide the amplified received RF signals as an output (e.g., to the RF circuitry 820). The transmit signal path of the FEM circuitry 830 may include a power amplifier (PA) to amplify input RF signals (e.g., provided by the RF circuitry 820), and one or more filters to generate RF signals for subsequent transmission (e.g., by one or more of the one or more antennas 832).

In some embodiments, the PMC 834 may manage power provided to the baseband circuitry 804. In particular, the PMC 834 may control power-source selection, voltage scaling, battery charging, or DC-to-DC conversion. The PMC 834 may often be included when the device 800 is capable of being powered by a battery, for example, when the device 800 is included in a UE. The PMC 834 may increase the power conversion efficiency while providing desirable implementation size and heat dissipation characteristics.

FIG. 8 shows the PMC 834 coupled only with the baseband circuitry 804. However, in other embodiments, the PMC 834 may be additionally or alternatively coupled with, and perform similar power management operations for, other components such as, but not limited to, the application circuitry 802, the RF circuitry 820, or the FEM circuitry 830.

In some embodiments, the PMC 834 may control, or otherwise be part of, various power saving mechanisms of the device 800. For example, if the device 800 is in an RRC_Connected state, where it is still connected to the RAN node as it expects to receive traffic shortly, then it may enter a state known as Discontinuous Reception Mode (DRX) after a period of inactivity. During this state, the device 800 may power down for brief intervals of time and thus save power.

If there is no data traffic activity for an extended period of time, then the device 800 may transition off to an RRC_Idle state, where it disconnects from the network and does not perform operations such as channel quality feedback, handover, etc. The device 800 goes into a very low power state and it performs paging where again it periodically wakes up to listen to the network and then powers down again. The device 800 may not receive data in this state, and in order to receive data, it transitions back to an RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 802 and processors of the baseband circuitry 804 may be used to execute elements of one or more instances of a protocol stack. For example, processors of the baseband circuitry 804, alone or in combination, may be used to execute Layer 3, Layer 2, or Layer 1 functionality, while processors of the application circuitry 802 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 9:
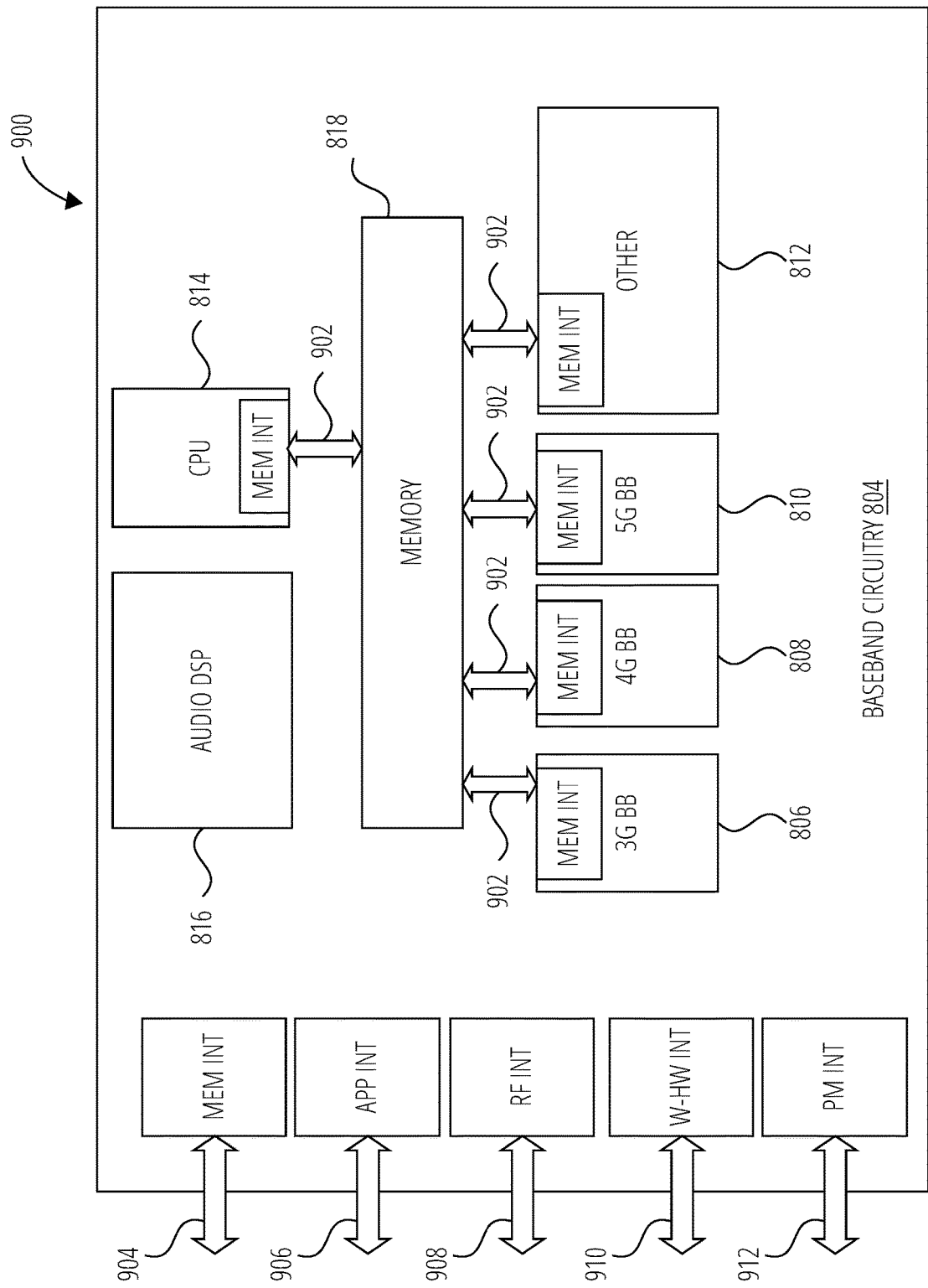
FIG. 9 illustrates an example interfaces in accordance with one embodiment.

FIG. 9 illustrates example interfaces 900 of baseband circuitry in accordance with some embodiments. As discussed above, the baseband circuitry 804 of FIG. 8 may comprise 3G baseband processor 806, 4G baseband processor 808, 5G baseband processor 810, other baseband processor(s) 812, CPU 814, and a memory 818 utilized by said processors. As illustrated, each of the processors may include a respective memory interface 902 to send/receive data to/from the memory 818.

The baseband circuitry 804 may further include one or more interfaces to communicatively couple to other circuitries/devices, such as a memory interface 904 (e.g., an interface to send/receive data to/from memory external to the baseband circuitry 804), an application circuitry interface 906 (e.g., an interface to send/receive data to/from the application circuitry 802 of FIG. 8), an RF circuitry interface 908 (e.g., an interface to send/receive data to/from RF circuitry 820 of FIG. 8), a wireless hardware connectivity interface 910 (e.g., an interface to send/receive data to/from Near Field Communication (NFC) components, Bluetooth® components (e.g., Bluetooth® Low Energy), Wi-Fi® components, and other communication components), and a power management interface 912 (e.g., an interface to send/receive power or control signals to/from the PMC 834.

Figure 10:
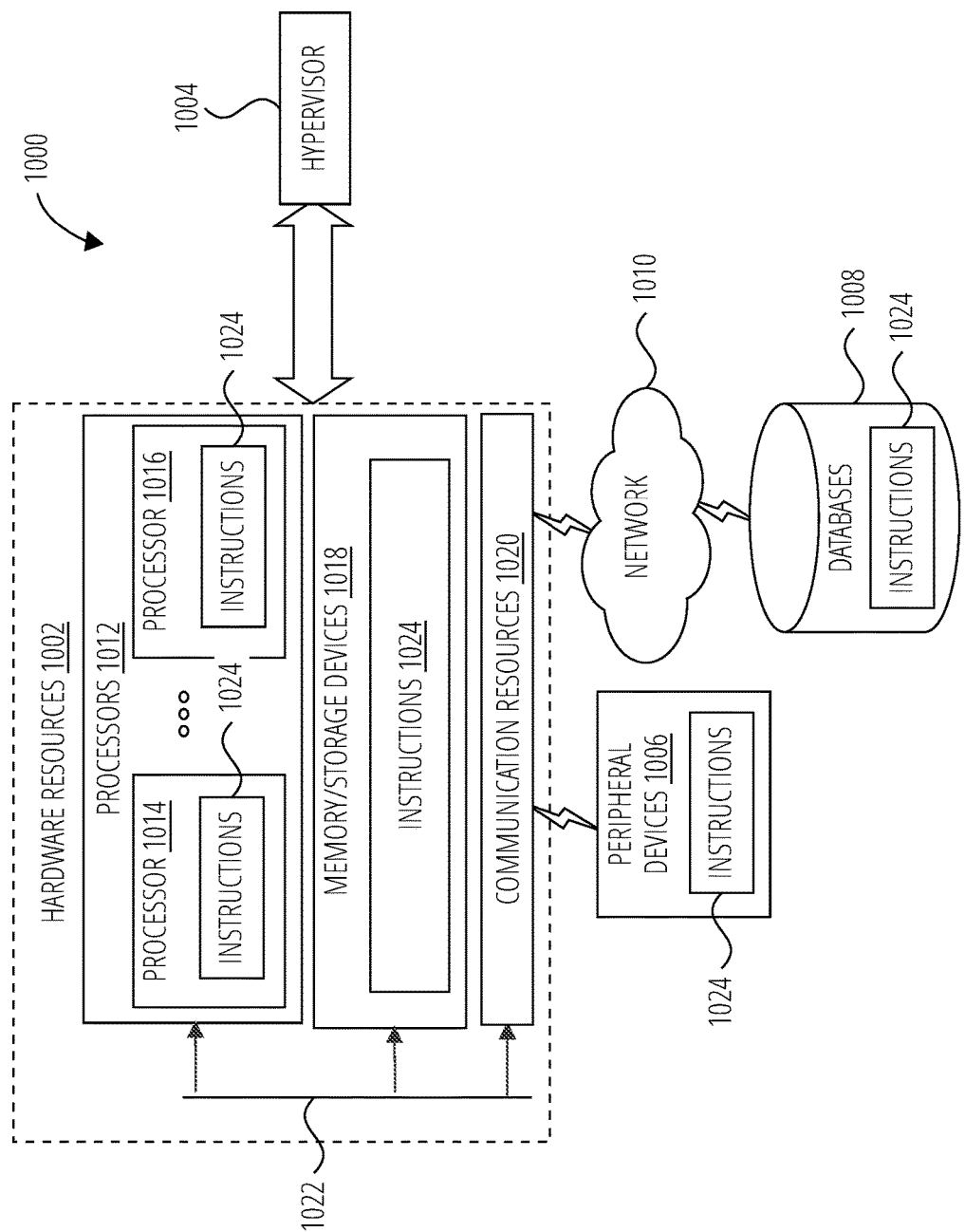
FIG. 10 illustrates components in accordance with one embodiment.

FIG. 10 is a block diagram illustrating components 1000, according to some example embodiments, able to read instructions from a machine-readable or computer-readable medium (e.g., a non-transitory machine-readable storage medium) and perform any one or more of the methodologies discussed herein. Specifically, FIG. 10 shows a diagrammatic representation of hardware resources 1002 including one or more processors 1012 (or processor cores), one or more memory/storage devices 1018, and one or more communication resources 1020, each of which may be communicatively coupled via a bus 1022. For embodiments where node virtualization (e.g., NFV) is utilized, a hypervisor 1004 may be executed to provide an execution environment for one or more network slices/sub-slices to utilize the hardware resources 1002.

The processors 1012 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1014 and a processor 1016.

The memory/storage devices 1018 may include main memory, disk storage, or any suitable combination thereof. The memory/storage devices 1018 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1020 may include interconnection or network interface components or other suitable devices to communicate with one or more peripheral devices 1006 or one or more databases 1008 via a network 1010. For example, the communication resources 1020 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1024 may comprise software, a program, an application, an applet, an app, or other executable code for causing at least any of the processors 1012 to perform any one or more of the methodologies discussed herein. The instructions 1024 may reside, completely or partially, within at least one of the processors 1012 (e.g., within the processor's cache memory), the memory/storage devices 1018, or any suitable combination thereof. Furthermore, any portion of the instructions 1024 may be transferred to the hardware resources 1002 from any combination of the peripheral devices 1006 or the databases 1008. Accordingly, the memory of the processors 1012, the memory/storage devices 1018, the peripheral devices 1006, and the databases 1008 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Example Section

The following examples pertain to further embodiments.

Example 1 is a non-transitory computer-readable storage medium. The computer-readable storage medium including instructions that when executed by a processor of an integrated access and backhaul (IAB) node in a wireless network, cause the processor to: detect a radio link failure (RLF) associated with a parent node in the wireless network; in response to the radio link failure, attempt to identify one or more alternate parent nodes; and generate a first backhaul RLF message to one or more descendants of the IAB node, the first backhaul RLF message indicating that at least the IAB node is not a candidate node for the one or more descendants.

Example 2 is the computer-readable storage medium of Example 1, wherein to detect the RLF comprises to lose communication with the parent node.

Example 3 is the computer-readable storage medium of Example 1, wherein to detect the RLF comprises to receive a second RLF message from the parent node, the second RLF message indicating that the parent node has experienced the RLF.

Example 4 is the computer-readable storage medium of Example 3, wherein the second RLF message further indicates that the parent node is not a candidate parent node among the one or more alternate parent nodes.

Example 5 is the computer-readable storage medium of Example 3, wherein the first backhaul RLF message further indicates that the parent node is not a candidate node for the one or more descendants.

Example 6 is the computer-readable storage medium of Example 3, wherein to attempt to identify the one or more alternate parent nodes comprises to search a group of IAB nodes that does not include the parent node.

Example 7 is the computer-readable storage medium of Example 3, wherein the instructions further configure the processor to: in response to receiving the second RLF message, start a recovery timer and generating the first backhaul RLF message; if the recovery timer does not expire before the IAB node is able to identify a candidate parent node from the one or more alternate parent nodes or if the IAB node receives a first backhaul recovery successful indication from the parent node, generate a second backhaul recovery successful indication to communicate to the one or more descendants of the IAB node and reestablishing a connection with the parent node; and if the recovery timer expires before the IAB node receives the first backhaul recovery successful indication from the parent node and the IAB node is able to identify the candidate parent node from the one or more alternate parent nodes, attach to the candidate parent node to establish a new route for the IAB node and the one or more descendants of the IAB node.

Example 8 is the computer-readable storage medium of Example 3, wherein the instructions further configure the processor to: if the recovery timer expires before the IAB node receives the first backhaul recovery successful indication from the parent node and the IAB node is not able to identify a candidate parent node from the one or more alternate parent nodes, generate and transmit the first backhaul RLF message to one or more descendants of the IAB node.

Example 9 is the computer-readable storage medium of Example 1, wherein the one or more descendants of the IAB node comprise at least one of a descendant IAB node and a user equipment (UE) attached to the IAB node.

Example 10 is the computer-readable storage medium of Example 1, wherein the instructions further configure the processor to: in response to being unable to identify the one or more alternate parent nodes, generate a signal, from a mobile terminal (MT) of the IAB node to a distributed unit (DU) of the IAB node, to transmit the first backhaul RLF message; and transmit, from the DU of the IAB node, the first backhaul RLF message.

Example 11 is the computer-readable storage medium of Example 10, wherein to transmit the first backhaul RLF message comprises to transmit one of backhaul adaptation protocol (BAP) message, a media access control (MAC) message, or a radio link control (RLC) message.

Example 12 is the computer-readable storage medium of Example 10, wherein to transmit the first backhaul RLF message comprises to transmit one of an RLF physical downlink control channel (PDCCH) on a downlink from the DU of the IAB node or a group common PDCCH (GC-PDCCH) broadcast to the one or more descendants of the IAB node.

Example 13 is the computer-readable storage medium of Example 1, wherein first RLF message comprises one or more of a first identification of one or more user equipment (UE) attached to the IAB, a second identification of one or more descendant IAB nodes directly or indirectly attached to the IAB node, a third identification of one or more UE attached to the one or more descendant IAB nodes, and a cause value for re-establishment.

Example 14 is the computer-readable storage medium of Example 1, wherein the first backhaul RLF message comprises a preliminary backhaul RLF indication, and wherein the instructions further configure the processor to: in response to being unable to identify the one or more alternate parent nodes, generate a second backhaul RLF message comprising a final backhaul indication.

Example 15 is a method for an integrated access and backhaul (IAB) node in a wireless network. The method includes: determining a radio link failure (RLF) associated with a parent IAB node; in response to the RLF, attempting to identify one or more alternate parent nodes; in response to failing to identify the one or more alternate parent nodes, updating first system information of the IAB node to indicate that the IAB node is barred, the first system information indicating that at least the IAB is not a candidate node.

Example 16 is the method of Example 15, wherein determining the RLF associated with the parent node comprises processing second system information associated with the parent node, the second system information indicating that the parent node is barred and is not a candidate parent node among the one or more alternate parent nodes.

Example 17 is the method of Example 16, wherein the first system information further indicates that the parent node is not the candidate node for one or more descendant nodes of the IAB node.

Example 18 is the method of Example 17, wherein the one or more descendant nodes comprise at least one of a descendant IAB node and a user equipment (UE) attached to the IAB node.

Example 19 is the method of Example 16, wherein attempting to identify the one or more alternate parent nodes comprises searching a group of IAB nodes that does not include the parent node.

Example 20 is the method of Example 15, wherein updating the first system information of the IAB node comprises updating one of a master information block (MIB) or a first system information block (SIB1).

Example 21 is an apparatus for a user equipment. The apparatus includes a memory interface and a baseband processor. The memory interface to send or receive, to or from a memory device, data corresponding to a backhaul radio link failure (RLF) indication. The baseband processor to: process the backhaul RLF indication comprising a list of one or more integrated access and backhaul (IAB) nodes that are not able to identify an alternate parent node; and in response to the backhaul RLF indication, search for an alternate access node without considering the one or more IAB nodes in the list.

Example 22 is the apparatus of Example 21, wherein the baseband processor is further configured to: in response to the backhaul RLF indication, start a recovery timer; if the recovery timer does not expire before receiving a backhaul recovery successful indication from a parent IAB node, cancel a recovery procedure and remain attached to the parent IAB node; and if the recovery timer expires before receiving the backhaul recovery successful indication, continue with the recovery procedure and attach to the alternate access node.

Example 23 is the apparatus of Example 21, wherein the backhaul RLF indication comprises a preliminary backhaul RLF indication, and wherein the baseband processor is further configured to: in response to the preliminary RLF indication, start to search for the alternate access node without considering the one or more IAB nodes in the list; receive a final backhaul RLF indication; and in response to receiving the final backhaul RLF indication, attach to the alternate access node.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

Computer systems and the computers in a computer system may be connected via a network. Suitable networks for configuration and/or use as described herein include one or more local area networks, wide area networks, metropolitan area networks, and/or Internet or IP networks, such as the World Wide Web, a private Internet, a secure Internet, a value-added network, a virtual private network, an extranet, an intranet, or even stand-alone machines which communicate with other machines by physical transport of media. In particular, a suitable network may be formed from parts or entireties of two or more other networks, including networks using disparate hardware and network communication technologies.

One suitable network includes a server and one or more clients; other suitable networks may include other combinations of servers, clients, and/or peer-to-peer nodes, and a given computer system may function both as a client and as a server. Each network includes at least two computers or computer systems, such as the server and/or clients. A computer system may include a workstation, laptop computer, disconnectable mobile computer, server, mainframe, cluster, so-called "network computer" or "thin client," tablet, smart phone, personal digital assistant or other hand-held computing device, "smart" consumer electronics device or appliance, medical device, or a combination thereof.

Suitable networks may include communications or networking software, such as the software available from Novell®, Microsoft®, and other vendors, and may operate using TCP/IP, SPX, IPX, and other protocols over twisted pair, coaxial, or optical fiber cables, telephone lines, radio waves, satellites, microwave relays, modulated AC power lines, physical media transfer, and/or other data transmission "wires" known to those of skill in the art. The network may encompass smaller networks and/or be connectable to other networks through a gateway or similar mechanism.

Various techniques, or certain aspects or portions thereof, may take the form of program code (i.e., instructions) embodied in tangible media, such as floppy diskettes, CD-ROMs, hard drives, magnetic or optical cards, solid-state memory devices, a nontransitory computer-readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and nonvolatile memory and/or storage elements), at least one input device, and at least one output device. The volatile and nonvolatile memory and/or storage elements may be a RAM, an EPROM, a flash drive, an optical drive, a magnetic hard drive, or other medium for storing electronic data. The eNB (or other base station) and UE (or other mobile station) may also include a transceiver component, a counter component, a processing component, and/or a clock component or timer component. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

Each computer system includes one or more processors and/or memory; computer systems may also include various input devices and/or output devices. The processor may include a general purpose device, such as an Intel®, AMD®, or other "off-the-shelf" microprocessor. The processor may include a special purpose processing device, such as ASIC, SoC, SiP, FPGA, PAL, PLA, FPLA, PLD, or other customized or programmable device. The memory may include static RAM, dynamic RAM, flash memory, one or more flip-flops, ROM, CD-ROM, DVD, disk, tape, or magnetic, optical, or other computer storage medium. The input device (s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, or off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Several aspects of the embodiments described will be illustrated as software modules or components. As used herein, a software module or component may include any type of computer instruction or computer-executable code located within a memory device. A software module may, for instance, include one or more physical or logical blocks of computer instructions, which may be organized as a routine, program, object, component, data structure, etc., that perform one or more tasks or implement particular data types. It is appreciated that a software module may be implemented in hardware and/or firmware instead of or in addition to software. One or more of the functional modules described herein may be separated into sub-modules and/or combined into a single or smaller number of modules.

In certain embodiments, a particular software module may include disparate instructions stored in different locations of a memory device, different memory devices, or different computers, which together implement the described functionality of the module. Indeed, a module may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Reference throughout this specification to "an example" means that a particular feature, structure, or characteristic described in connection with the example is included in at least one embodiment. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples may be referred to herein along with alternatives for the various components thereof. It is understood that such embodiments, examples, and alternatives are not to be construed as de facto equivalents of one another, but are to be considered as separate and autonomous representations.

Furthermore, the described features, structures, or characteristics may be combined in any suitable manner in one or more embodiments. In the following description, numerous specific details are provided, such as examples of materials, frequencies, sizes, lengths, widths, shapes, etc., to provide a thorough understanding of the embodiments. One skilled in the relevant art will recognize, however, that the embodiments may be practiced without one or more of the specific details, or with other methods, components, materials, etc. In other instances, well-known structures, materials, or operations are not shown or described in detail to avoid obscuring aspects of embodiments.

It should be recognized that the systems described herein include descriptions of specific embodiments. These embodiments can be combined into single systems, partially combined into other systems, split into multiple systems or divided or combined in other ways. In addition, it is contemplated that parameters/attributes/aspects/etc. of one embodiment can be used in another embodiment. The parameters/attributes/aspects/etc. are merely described in one or more embodiments for clarity, and it is recognized that the parameters/attributes/aspects/etc. can be combined with or substituted for parameters/attributes/etc. of another embodiment unless specifically disclaimed herein.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A non-transitory computer-readable storage medium, the computer-readable storage medium including instructions that, when executed by a processor of an integrated access and backhaul (IAB) node in a wireless network, cause the IAB node to:
    detect a radio link failure (RLF) associated with a parent node in the wireless network; and
    in response to detecting the RLF associated with the parent node in the wireless network:
        transmit a first backhaul RLF indication message to one or more descendants of the IAB node, the first backhaul RLF indication message comprising identities of one or more nodes, including the parent node, not to be considered as a candidate node for the one or more descendants;
        after transmitting the first backhaul RLF indication message, attempt to identify one or more alternate parent nodes for the IAB node; and
        in response to being unable to identify the one or more alternate parent nodes, transmit a second backhaul RLF indication message to the one or more descendants of the IAB node, the second backhaul RLF indication message indicating that the IAB node is also not to be considered the candidate node for the one or more descendants.

2. The non-transitory computer-readable storage medium of claim 1, wherein to detect the RLF comprises to lose communication with the parent node.

3. The non-transitory computer-readable storage medium of claim 1, wherein to detect the RLF comprises to receive an RLF message from the parent node, the RLF message indicating that the parent node has experienced the RLF.

4. The non-transitory computer-readable storage medium of claim 3, wherein the RLF message further indicates that the parent node is not a candidate parent node among the one or more alternate parent nodes.

5. The non-transitory computer-readable storage medium of claim 3, wherein to attempt to identify the one or more alternate parent nodes comprises to search a group of IAB nodes that does not include the parent node.

6. The non-transitory computer-readable storage medium of claim 3, wherein the instructions further configure the IAB node to:
    in response to receiving the RLF message, start a recovery timer and generate the first backhaul RLF indication message;
    if the recovery timer does not expire before the IAB node is able to identify a candidate parent node from the one or more alternate parent nodes or if the IAB node receives a first backhaul recovery successful indication from the parent node, generate a second backhaul recovery successful indication to communicate to the one or more descendants of the IAB node and reestablishing a connection with the parent node; and
    if the recovery timer expires before the IAB node receives the first backhaul recovery successful indication from the parent node and the IAB node is able to identify the candidate parent node from the one or more alternate parent nodes, attach to the candidate parent node to establish a new route for the IAB node and the one or more descendants of the IAB node.

7. The non-transitory computer-readable storage medium of claim 6, wherein the instructions further configure the IAB node to:
    if the recovery timer expires before the IAB node receives the first backhaul recovery successful indication from the parent node and the IAB node is not able to identify the candidate parent node from the one or more alternate parent nodes, transmit the first backhaul RLF indication message to the one or more descendants of the IAB node.

8. The non-transitory computer-readable storage medium of claim 1, wherein the one or more descendants of the IAB node comprise at least one of a descendant IAB node and a user equipment (UE) attached to the IAB node.

9. The non-transitory computer-readable storage medium of claim 1, wherein the instructions further configure the IAB node to:
in response to being unable to identify the one or more alternate parent nodes, generate a signal, from a mobile terminal (MT) of the IAB node to a distributed unit (DU) of the IAB node, to transmit the first backhaul RLF indication message; and
transmit, from the DU of the IAB node, the first backhaul RLF indication message.

10. The non-transitory computer-readable storage medium of claim 1, wherein first backhaul RLF indication message comprises one or more of a first identification of one or more user equipment (UE) attached to the IAB, a second identification of one or more descendant IAB nodes directly or indirectly attached to the IAB node, a third identification of one or more UE attached to the one or more descendant IAB nodes, and a cause value for re-establishment.

11. A method for an integrated access and backhaul (IAB) node in a wireless network, the method comprising:
detecting a radio link failure (RLF) associated with a parent node in the wireless network; and
in response to detecting the RLF associated with the parent node in the wireless network:
transmitting a first backhaul RLF indication message to one or more descendants of the IAB node, the first backhaul RLF indication message comprising identities of one or more nodes, including the parent node, not to be considered as a candidate node for the one or more descendants;
after transmitting the first backhaul RLF indication message, attempting to identify one or more alternate parent nodes for the IAB node; and
in response to being unable to identify the one or more alternate parent nodes, transmitting a second backhaul RLF indication message to the one or more descendants of the IAB node, the second backhaul RLF indication message indicating that the IAB node is also not to be considered the candidate node for the one or more descendants.

12. The method of claim 11, wherein detecting the RLF comprises losing communication with the parent node.

13. The method of claim 11, wherein detecting the RLF comprises receiving an RLF message from the parent node, the RLF message indicating that the parent node has experienced the RLF.

14. The method of claim 13, wherein the RLF message further indicates that the parent node is not a candidate parent node among the one or more alternate parent nodes.

15. The method of claim 13, wherein attempting to identify the one or more alternate parent nodes comprises searching a group of IAB nodes that does not include the parent node.

16. The method of claim 13, further comprising:
in response to receiving the RLF message, starting a recovery timer and generating the first backhaul RLF indication message;
if the recovery timer does not expire before the IAB node is able to identify a candidate parent node from the one or more alternate parent nodes or if the IAB node receives a first backhaul recovery successful indication from the parent node, generating a second backhaul recovery successful indication to communicate to the one or more descendants of the IAB node and reestablishing a connection with the parent node; and
if the recovery timer expires before the IAB node receives the first backhaul recovery successful indication from the parent node and the IAB node is able to identify the candidate parent node from the one or more alternate parent nodes, attaching to the candidate parent node to establish a new route for the IAB node and the one or more descendants of the IAB node.

17. The method of claim 16, further comprising:
if the recovery timer expires before the IAB node receives the first backhaul recovery successful indication from the parent node and the IAB node is not able to identify the candidate parent node from the one or more alternate parent nodes, transmitting the first backhaul RLF indication message to the one or more descendants of the IAB node.

18. The method of claim 11, wherein the one or more descendants of the IAB node comprise at least one of a descendant IAB node and a user equipment (UE) attached to the IAB node.

19. The method of claim 11, further comprising:
in response to being unable to identify the one or more alternate parent nodes, generating a signal, from a mobile terminal (MT) of the IAB node to a distributed unit (DU) of the IAB node, to transmit the first backhaul RLF indication message; and
transmitting, from the DU of the IAB node, the first backhaul RLF indication message.

20. The method of claim 11, wherein first backhaul RLF indication message comprises one or more of a first identification of one or more user equipment (UE) attached to the IAB, a second identification of one or more descendant IAB nodes directly or indirectly attached to the IAB node, a third identification of one or more UE attached to the one or more descendant IAB nodes, and a cause value for re-establishment.

* * * * *